US009489061B2

(12) United States Patent
Piot et al.

(10) Patent No.: US 9,489,061 B2
(45) Date of Patent: Nov. 8, 2016

(54) METHOD AND SYSTEM FOR POWER CONSERVATION IN A MULTI-ZONE INPUT DEVICE

(75) Inventors: Julien Piot, Rolle (CH); Baptiste Merminod, Carrouge (CH); Christophe Dayer, Onex (CH); Niall White, Golden (IE); Stephen Harvey, Mallow (IE); Frederic Fortin, Annemasse (FR); Mathieu Meisser, La Conversion/Lutry (CH); Nicolas Ramond, Lugrin (CH); Olivier Mathis, Grimisuat (CH); Regis Croisonnier, Saint Martin Bellevue (FR)

(73) Assignee: Logitech Europe S.A., Lausanne (CH)

( * ) Notice: Subject to any disclaimer, the term of this patent is extended or adjusted under 35 U.S.C. 154(b) by 305 days.

(21) Appl. No.: 13/296,051

(22) Filed: Nov. 14, 2011

(65) Prior Publication Data

US 2013/0120262 A1 May 16, 2013

(51) Int. Cl.
*G06F 3/0354* (2013.01)
*G06F 1/16* (2006.01)
(Continued)

(52) U.S. Cl.
CPC ......... *G06F 3/03547* (2013.01); *G06F 1/1694* (2013.01); *G06F 1/3215* (2013.01); *G06F 1/3259* (2013.01); *G06F 3/038* (2013.01); *G06F 3/0346* (2013.01); *G06F 3/03541* (2013.01);
(Continued)

(58) Field of Classification Search
CPC .. G06F 3/03543; G06F 3/033; G06F 3/0304; G06F 3/044; G06F 1/3259; G06F 3/04886; G06F 3/03547; G06F 2203/04106; G06F 2200/1637; G06F 1/169; G06F 2203/0333; G06F 1/1692; G06F 3/0487; G06F 1/1694; G06F 1/3206; G06F 3/0346; G06F 3/0412

USPC .................. 345/163, 166, 173; 235/462.45; 713/300; 178/18.06, 18.03
See application file for complete search history.

(56) References Cited

U.S. PATENT DOCUMENTS 4,977,397 A 12/1990 Kuo et al.
5,555,894 A 9/1996 Doyaman et al.
(Continued)

FOREIGN PATENT DOCUMENTS

WO WO 91/04526 4/1991

OTHER PUBLICATIONS

U.S. Appl. No. 13/296,006, filed Nov. 14, 2011 by Julien Piot et al.
(Continued)

*Primary Examiner* — Michael J Eurice
(74) *Attorney, Agent, or Firm* — Kilpatrick Townsend & Stockton LLP

(57) ABSTRACT

A method includes placing an input device in a passive mode of operation and periodically monitoring a displacement sensor of the input device, receiving an indication of displacement from the displacement sensor, and placing the input device in an active mode of operation characterized by a power consumption level. The method also includes determining a passing of a predetermined time period since receiving the indication of displacement, placing the input device in a second active mode of operation characterized by a second power consumption level less than the power consumption level, and periodically monitoring one or more of a plurality of touch sensors. The method further includes receiving an indication of input from the one or more of the plurality of touch sensors and placing the input device in the active mode of operation.

17 Claims, 27 Drawing Sheets

(51) Int. Cl.
  *G06F 3/041* (2006.01)
  *G06F 3/0346* (2013.01)
  *G06F 3/044* (2006.01)
  *G06F 3/038* (2013.01)
  *G06F 1/32* (2006.01)

(52) U.S. Cl.
  CPC .......... *G06F 3/03543* (2013.01); *G06F 3/044* (2013.01); *G06F 3/0412* (2013.01); *G06F 3/0416* (2013.01); *G06F 2200/1637* (2013.01); *G06F 2203/0339* (2013.01); *Y02B 60/1253* (2013.01)

(56) References Cited

U.S. PATENT DOCUMENTS

| | | | |
|---|---|---|---|
| 5,748,185 A | 5/1998 | Stephan et al. | |
| 5,771,038 A | 6/1998 | Wang | |
| 5,805,144 A | 9/1998 | Scholder et al. | |
| 5,943,052 A | 8/1999 | Allen et al. | |
| 5,956,019 A | 9/1999 | Bang et al. | |
| 6,005,553 A | 12/1999 | Goldstein et al. | |
| 6,043,809 A | 3/2000 | Holehan | |
| 6,198,473 B1 | 3/2001 | Armstrong | |
| 6,300,941 B1 | 10/2001 | Segalle | |
| 6,333,753 B1 | 12/2001 | Hinckley | |
| 6,396,477 B1 | 5/2002 | Hinckley et al. | |
| 6,456,275 B1 | 9/2002 | Hinckley et al. | |
| 6,507,093 B2 | 1/2003 | Kaneda et al. | |
| 6,559,830 B1 | 5/2003 | Hinckley et al. | |
| 6,624,824 B1 | 9/2003 | Tognazzini et al. | |
| 6,781,570 B1* | 8/2004 | Arrigo | G06F 3/0317 345/156 |
| RE40,324 E | 5/2008 | Crawford | |
| 7,990,160 B2 | 8/2011 | Reynolds | |
| 2001/0015718 A1 | 8/2001 | Hinckley et al. | |
| 2001/0033268 A1 | 10/2001 | Jiang | |
| 2001/0052894 A1 | 12/2001 | Segalle | |
| 2002/0035701 A1 | 3/2002 | Casebolt et al. | |
| 2002/0044133 A1 | 4/2002 | Nakamura et al. | |
| 2002/0054172 A1 | 5/2002 | Berman et al. | |
| 2002/0057258 A1 | 5/2002 | Reid et al. | |
| 2002/0063688 A1 | 5/2002 | Shaw et al. | |
| 2002/0070277 A1 | 6/2002 | Hannigan | |
| 2002/0093491 A1* | 7/2002 | Gillespie et al. | 345/173 |
| 2002/0109672 A1 | 8/2002 | Kehlstadt et al. | |
| 2002/0130835 A1* | 9/2002 | Brosnan | 345/156 |
| 2002/0140668 A1 | 10/2002 | Crawford | |
| 2002/0167699 A1 | 11/2002 | Verplaetse et al. | |
| 2002/0190953 A1* | 12/2002 | Gordon | G06F 3/0317 345/166 |
| 2003/0034959 A1* | 2/2003 | Davis et al. | 345/166 |
| 2003/0058218 A1* | 3/2003 | Crane et al. | 345/158 |
| 2003/0076301 A1 | 4/2003 | Tsuk et al. | |
| 2003/0076303 A1 | 4/2003 | Huppi | |
| 2003/0095096 A1 | 5/2003 | Robbin et al. | |
| 2003/0107547 A1 | 6/2003 | Kehlstadt et al. | |
| 2003/0132950 A1* | 7/2003 | Surucu | G06F 1/1626 715/700 |
| 2003/0156098 A1 | 8/2003 | Shaw et al. | |
| 2004/0113890 A1* | 6/2004 | Ranta | 345/166 |
| 2004/0130532 A1* | 7/2004 | Gordon et al. | 345/166 |
| 2004/0135825 A1* | 7/2004 | Brosnan | 345/857 |
| 2004/0212587 A1 | 10/2004 | Kong | |
| 2004/0234107 A1* | 11/2004 | Machida et al. | 382/107 |
| 2004/0252109 A1 | 12/2004 | Trent et al. | |
| 2005/0024336 A1* | 2/2005 | Xie et al. | 345/166 |
| 2005/0151724 A1* | 7/2005 | Lin et al. | 345/166 |
| 2006/0028449 A1* | 2/2006 | Ranta | 345/163 |
| 2006/0030374 A1* | 2/2006 | Ranta | 455/574 |
| 2006/0038783 A1 | 2/2006 | Shaw et al. | |
| 2006/0087495 A1* | 4/2006 | Davis et al. | 345/166 |
| 2006/0132435 A1 | 6/2006 | Machida | 345/157 |
| 2006/0132443 A1* | 6/2006 | Chien Wu | 345/166 |
| 2006/0166710 A1* | 7/2006 | Ranta | 455/574 |
| 2006/0176277 A1 | 8/2006 | Daniel et al. | |
| 2006/0274055 A1* | 12/2006 | Reynolds et al. | 345/174 |
| 2007/0061126 A1 | 3/2007 | Russo et al. | |
| 2007/0139379 A1* | 6/2007 | Kehlstadt et al. | 345/163 |
| 2007/0152977 A1* | 7/2007 | Ng et al. | 345/173 |
| 2007/0188456 A1 | 8/2007 | Shaft et al. | |
| 2007/0247428 A1* | 10/2007 | Hock et al. | 345/166 |
| 2007/0279384 A1* | 12/2007 | Brosnan | 345/166 |
| 2008/0006453 A1 | 1/2008 | Hotelling | |
| 2008/0010616 A1 | 1/2008 | Algreatly | |
| 2008/0048978 A1 | 2/2008 | Trent et al. | |
| 2008/0062131 A1* | 3/2008 | Chan et al. | 345/166 |
| 2008/0174787 A1* | 7/2008 | Teo et al. | 356/614 |
| 2008/0228429 A1* | 9/2008 | Huang | G06F 1/1626 702/141 |
| 2008/0297476 A1* | 12/2008 | Hotelling et al. | 345/163 |
| 2009/0025036 A1 | 1/2009 | White et al. | |
| 2009/0051659 A1 | 2/2009 | Mickelborough | |
| 2009/0146955 A1 | 6/2009 | Truong | |
| 2009/0229892 A1 | 9/2009 | Fisher et al. | |
| 2009/0231275 A1 | 9/2009 | Odgers | |
| 2009/0254869 A1* | 10/2009 | Ludwig et al. | 715/863 |
| 2010/0033424 A1* | 2/2010 | Kabasawa | G01C 17/28 345/156 |
| 2010/0073327 A1* | 3/2010 | Mau et al. | 345/175 |
| 2010/0149127 A1 | 6/2010 | Fisher et al. | |
| 2010/0242274 A1 | 9/2010 | Rosenfeld et al. | |
| 2010/0245246 A1 | 9/2010 | Rosenfeld et al. | |
| 2010/0257392 A1* | 10/2010 | Ranta | 713/323 |
| 2011/0012845 A1 | 1/2011 | Rothkopf et al. | |
| 2011/0109552 A1 | 5/2011 | Yasutake | |
| 2011/0109553 A1* | 5/2011 | Tsao | G06F 3/03543 345/163 |
| 2011/0133687 A1* | 6/2011 | Kim | H04M 1/21 320/101 |
| 2011/0148763 A1* | 6/2011 | Yamamoto et al. | 345/158 |
| 2011/0157011 A1 | 6/2011 | Kelley | |
| 2011/0157017 A1 | 6/2011 | Webb et al. | |
| 2011/0158143 A1* | 6/2011 | Yun | H04W 52/0251 370/311 |
| 2011/0195781 A1 | 8/2011 | Chen et al. | |
| 2011/0227947 A1 | 9/2011 | Benko et al. | |
| 2011/0246877 A1* | 10/2011 | Kwak | G06F 3/0488 715/702 |
| 2011/0267291 A1* | 11/2011 | Choi | G06F 1/1692 345/173 |
| 2011/0304539 A1* | 12/2011 | Lee | G06F 1/1626 345/158 |
| 2012/0299864 A1* | 11/2012 | Tong | G06F 3/044 345/174 |
| 2012/0306927 A1* | 12/2012 | Lee | G06F 3/041 345/660 |
| 2014/0157210 A1* | 6/2014 | Katz | G06F 3/017 715/863 |

OTHER PUBLICATIONS

U.S. Appl. No. 13/296,025, filed Nov. 14, 2011 by Julien Piot et al.
U.S. Appl. No. 13/296,043, filed Nov. 14, 2011 by Julien Piot et al.
China Intellectual Property Office office action for patent application CN201210458603.7 (Apr. 21, 2015).
U.S. Appl. No. 13/296,006, Non-Final Office Action mailed on Dec. 6, 2013, 27 pages.
U.S. Appl. No. 13/296,006, Final Office Action mailed on Jun. 18, 2014, 22 pages.
U.S. Appl. No. 13/296,006, Non-Final Office Action mailed on Mar. 6, 2015, 28 pages.
U.S. Appl. No. 13/296,025, Non-Final Office Action mailed on Dec. 30, 2013, 21 pages.
U.S. Appl. No. 13/296,025, Final Office Action mailed on Jun. 25, 2014, 25 pages.
U.S. Appl. No. 13/296,025, Non-Final Office Action mailed on Feb. 24, 2015, 33 pages.
U.S. Appl. No. 13/296,025, Notice of Allowance mailed on Jul. 7, 2015, 7 pages.
U.S. Appl. No. 13/296,043, Non-Final Office Action mailed on Dec. 1, 2013, 19 pages.

(56) References Cited

OTHER PUBLICATIONS

U.S. Appl. No. 13/296,043, Final Office Action mailed on Jul. 10, 2014, 19 pages.
U.S. Appl. No. 13/296,043, Non-Final Office Action mailed on Jan. 26, 2015 28 pages.
Office Action dated Nov. 18, 2015 for German Patent Application DE102012021839.7.
Office Action dated Nov. 18, 2015 for German Patent Application DE102012021771.4.
Office Action dated Nov. 18, 2015 for German Patent Application DE102012021768.4.
Office Action dated Oct. 29, 2015 for German Patent Application DE102012021760.9.
U.S. Appl. No. 13/296,006, Notice of Allowance mailed on Oct. 29, 2015, 5 pages.
U.S. Appl. No. 13/296,043, Notice of Allowance mailed on Jul. 17, 2015, 5 pages.
U.S. Appl. No. 13/296,006, Final Office Action mailed on Jul. 20, 2015, 15 pages.

* cited by examiner

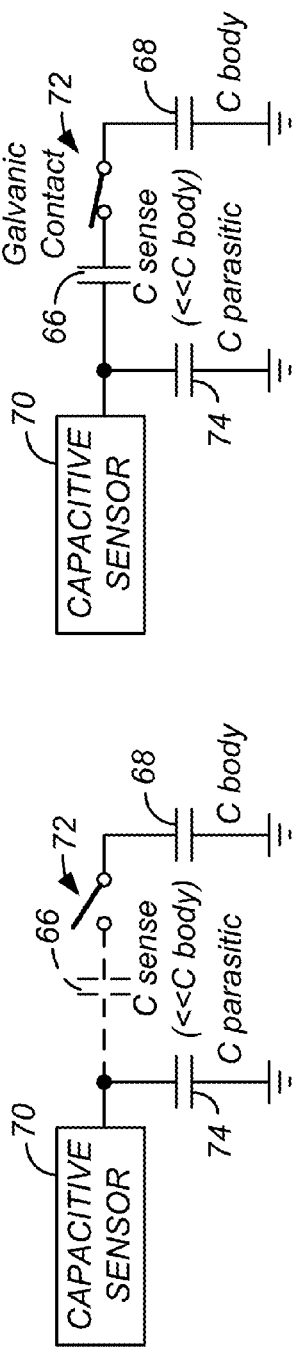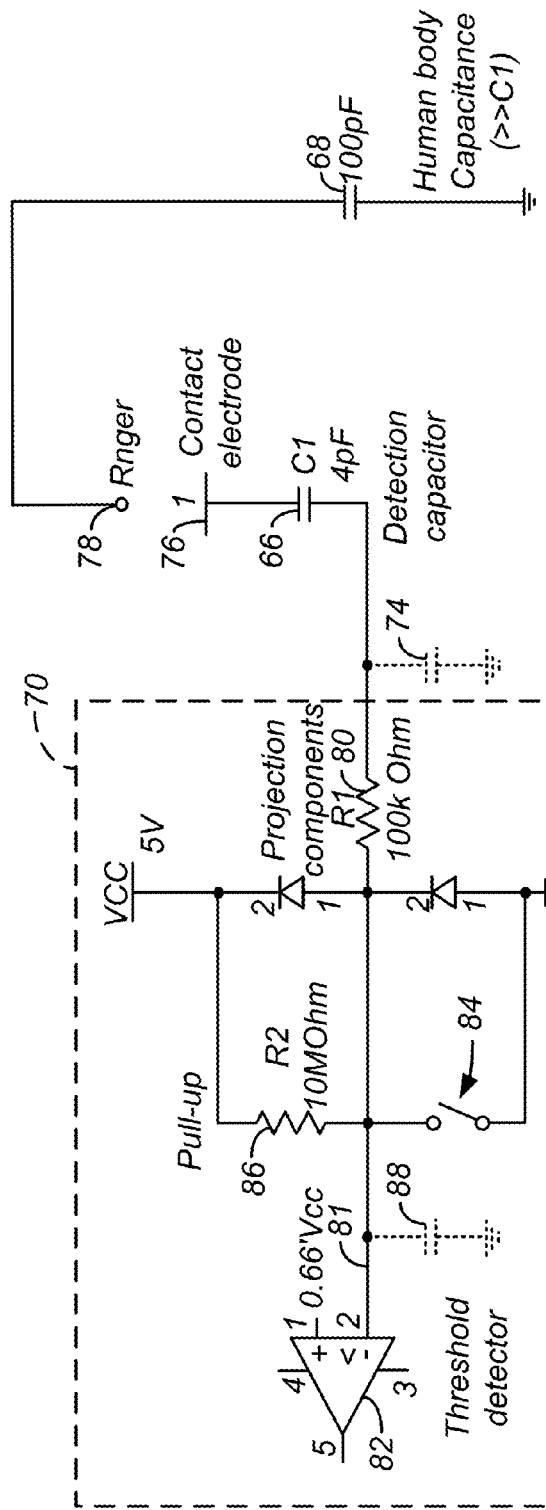

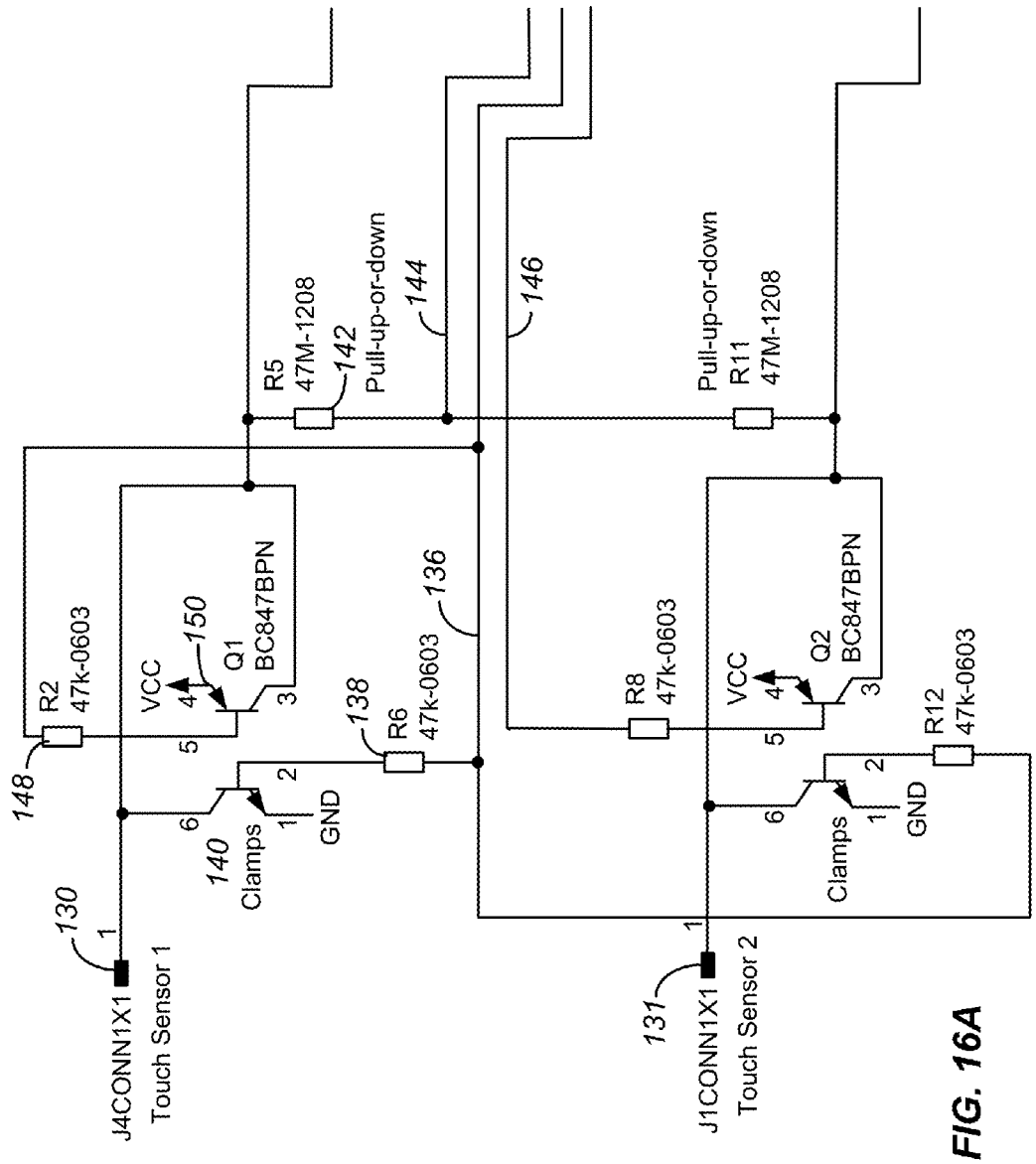

Zoom

Scroll/pan

Rotate

| Row | MOUSE MOVEMENT (x, y) | ZONE ① | ZONE ② | ZONE ③ | RESULT |
|---|---|---|---|---|---|
| 1 | NO | ↔ or ↻ | NO (rest) | NO (rest) | V-SCROLL |
| 2 | NO | ↔ or ↻ | CLICK | NO (rest) | CLICK + VSCROLL (select) |
| 3 | NO NO | NO NO | ↕ NO (rest) | NO (rest) ↕ — or — | H-SCROLL (pan) |
| 4 | NO | NO | ↕ | ↕ | H-SCROLL 2X SPEED |
| 5 | NO | ↙↙ | ↑↓ | ↑↓ — or — | FORWARD / NEXT BACK / PREVIOUS |
| 6 | NO | ↙ | ↑ NO | NO ↑ | ZOOM IN |
| 7 | ↕↔ | NO | CLICK | NO (rest) | PAN ⇔ "hand" |

*FIG. 28B*

METHOD AND SYSTEM FOR POWER CONSERVATION IN A MULTI-ZONE INPUT DEVICE

CROSS-REFERENCES TO RELATED APPLICATIONS

The following regular U.S. patent applications (including this one) are being filed concurrently, and the entire disclosure of the other applications are incorporated by reference into this application for all purposes:
application Ser. No. 13/296,006, filed Nov. 14, 2011, entitled "INPUT DEVICE WITH MULTIPLE TOUCH-SENSITIVE ZONES"
application Ser. No. 13/296,025, filed Nov. 14, 2011, entitled "CONTROL SYSTEM FOR MULTI-ZONE INPUT DEVICE";
application Ser. No. 13/296,043, filed Nov. 14, 2011, entitled "METHOD OF OPERATING A MULTI-ZONE INPUT DEVICE"; and
application Ser. No. 13/296,051, filed Nov. 14, 2011, entitled "METHOD AND SYSTEM FOR POWER CONSERVATION IN A MULTI-ZONE INPUT DEVICE."

BACKGROUND OF THE INVENTION

A number of computer mice include a roller or wheel which can be rotated by a user's finger. Typically, such a roller is used for scrolling. One example is set forth in Logitech U.S. Pat. No. 6,157,369, and other examples are described in the background section of that patent. Some of the disadvantages of a roller are that it is a mechanical element, and thus subject to mechanical failure since it is susceptible to dirt and shock. In addition, its size can make it difficult to integrate into some form factors such as a very low profile mouse.

Other patents describing a roller or wheel include U.S. Pat. No. 5,530,455 and U.S. Pat. No. 5,473,344. U.S. Pat. No. 5,530,455 also describes determining the speed of scrolling in the mouse driver software, and switching between line scrolling and page scrolling depending on the speed.

Despite the progress made in pointing devices, there is a need in the art for improved methods and systems related to input devices.

SUMMARY OF THE INVENTION

The present invention relates generally to computer control devices. More particularly, the present invention relates to a input device including multiple solid-state touch-sensitive zones. Merely by way of example, the invention has been applied to a computer mouse with multiple touch pads enabling advanced gestures. The methods and techniques can be applied to a variety of other control systems including joysticks, presentation controllers, and the like.

According to an embodiment of the present invention, a pointing device is provided. The pointing device includes a housing for supporting a user's hand and a pointing sensor mounted in the housing for providing a pointing signal. The pointing device also includes a first portion of the housing operable to receive a first digit of the user and a first solid-state touch sensor disposed in the first portion and operable to detect movement of the first digit along the first portion. The pointing device further includes a second portion on the housing operable to receive a second digit of the user and a second solid-state touch sensor disposed in the second portion and operable to detect movement of the second digit along the second portion.

According to another embodiment of the present invention, a cursor control peripheral device is provided. The cursor control peripheral device includes a housing adapted to support a user's hand and a sensor operable to monitor motion of the housing in two dimensions. The cursor control peripheral device also includes a first touch pad disposed in the housing and adjacent a first digit of the user's hand during operation and a second touch pad disposed in the housing and adjacent a second digit of the user's hand during operation.

According to another embodiment of the present invention, a method of operating a computer mouse having a pointing sensor, multiple touch pads, and a proximity sensor is provided. The method includes placing the computer mouse in a passive mode of operation and monitoring the pointing sensor to provide a motion value. The method also includes monitoring the multiple touch pads to provide a plurality of touch values and monitoring the proximity sensor to provide a proximity value. The method further includes determining an increase in the proximity value associated with motion of at least a portion of a user's hand toward the computer mouse and placing the computer mouse in an active mode of operation.

According to yet another embodiment of the present invention, a non-transitory computer-readable storage medium including a plurality of computer-readable instructions tangibly embodied on the computer-readable storage medium, which, when executed by a data processor, provide for operation of a computer mouse having a pointing sensor, multiple touch pads, and a proximity sensor is provided. The plurality of instructions include instructions that cause the data processor to place the computer mouse in a passive mode of operation and instructions that cause the data processor to monitor the pointing sensor to provide a motion value. The plurality of instructions also include instructions that cause the data processor to monitor the multiple touch pads to provide a plurality of touch values and instructions that cause the data processor to monitor the proximity sensor to provide a proximity value. The plurality of instruction further include instructions that cause the data processor to determine an increase in the proximity value associated with motion of at least a portion of a user's hand toward the computer mouse and instructions that cause the data processor to place the computer mouse in an active mode of operation.

According to an embodiment of the present invention, an input device is provided. The input device includes a housing for supporting a user's hand and a displacement sensor, mounted in the housing, for providing a displacement signal. The input device also includes a first portion of the housing operable to receive a first digit of the user and a first solid-state touch sensor disposed in the first portion and operable to detect movement of the first digit along the first portion. The input device further includes a second portion on the housing operable to receive a second digit of the user and a second solid-state touch sensor disposed in the second portion and operable to detect movement of the second digit along the second portion.

According to another embodiment of the present invention, an input device is provided. The input device includes a housing for supporting a user's hand and a displacement sensor, mounted in the housing, for providing a displacement signal. The input device also includes a first portion of the housing including a first surface and operable to receive a first digit of the user and a first solid-state touch sensor disposed in the first portion and operable to detect movement of the first digit along the first portion. The input device further includes a second portion on the housing including a second surface and operable to receive a second digit of the user, wherein the first surface and the second surface are not coplanar and a second solid-state touch sensor disposed in the second portion and operable to detect movement of the second digit along the second portion.

According to yet another embodiment of the present invention, a device is provided. The device includes a housing adapted to support a user's hand and a sensor operable to monitor motion of the housing in at least two dimensions. The device also includes a first touch sensor disposed in the housing and adjacent a first digit of the user's hand during operation and a second touch sensor disposed in the housing and adjacent a second digit of the user's hand during operation.

According to a specific embodiment of the present invention, a non-transitory computer-readable storage medium including a plurality of computer-readable instructions tangibly embodied on the computer-readable storage medium, which, when executed by a data processor, provide for operation of an input device, is provided. The plurality of instructions include instructions that cause the data processor to place the input device in a passive mode of operation and instructions that cause the data processor to monitor a displacement sensor of the input device to provide a motion value. The plurality of instructions also include instructions that cause the data processor to monitor a plurality of touch pads of the input device to provide a plurality of touch values and instructions that cause the data processor to monitor a proximity sensor of the input device to provide a proximity value. The plurality of instructions further include instructions that cause the data processor to determine an increase in the proximity value and instructions that cause the data processor to place the computer mouse in an active mode of operation.

According to an alternative embodiment of the present invention, a touch sensor system is provided. The touch sensor system includes a touch controller having a first connector and a second connector and multiple sensor zones. The touch sensor system also includes a plurality of drive lines connected to the first connector of the touch controller and to the multiple sensor zones and a plurality of sets of sense lines connected to the second connector of the touch controller. Each set of the plurality of sets of sense lines is connected to one of the multiple sensor zones.

According to another alternative embodiment of the present invention, an input device is provided. The input device includes a housing adapted to support a user's hand and a sensor operable to monitor motion of the housing in two dimensions. The input device also includes a first touch pad disposed in the housing and a second touch pad disposed in the housing. The input device further includes a microprocessor electrically connected to the first touch pad and the second touch pad and a plurality of drive lines connected to the microprocessor and extending over the first touch pad and the second touch pad. Additionally, the input device includes a plurality of sets of sense lines connected to the microprocessor. A first set of the plurality of sets of sense lines is electrically connected to the first touch pad and a second set of the plurality of sets of sense lines is electrically connected to the second touch pad.

According to yet another alternative embodiment of the present invention, a method is provided. The method includes providing, using a plurality of drive lines, a set of common drive signals to each of a plurality of sensor zones and receiving, at a touch controller, a first set of sense signals from a first sensor zone of the plurality of sensor zones using a first set of sense lines of a plurality of sets of sense lines. The method also includes receiving, at the touch controller, a second set of sense signals from a second sensor zone of the plurality of sensor zones using a second set of sense lines of the plurality of sense lines.

According to a specific embodiment of the present invention, a method of operating an input device in conjunction with a host device is provided. The method includes determining that the input device is in a stationary state and receiving a first signal from a first sense zone of the input device. The method also includes determining an input command based on determining that the input device is in the stationary state and the first signal and transmitting a signal associated with the input command from the input device to the host device.

According to another specific embodiment of the present invention, a method is provided. The method includes providing an input device having a motion sensor and a plurality of two-dimensional touch pads and determining that the input device is in a stationary state. The method also includes receiving a first touch signal from one of the plurality of two-dimensional touch pads. The first touch signal is associated with at least one of a clockwise or counterclockwise rotation. The method further includes receiving a second touch signal from another of the plurality of two-dimensional touch pads. The second touch signal is associated with a horizontal scrolling motion. Additionally, the method includes transmitting a control signal associated with at least one of a forward action or a back action to an electronic device.

According to yet another specific embodiment of the present invention, a method is provided. The method includes placing an input device in a passive mode of operation and periodically monitoring a displacement sensor of the input device. The method also includes receiving an indication of displacement from the displacement sensor and placing the input device in an active mode of operation characterized by a power consumption level. The method further includes determining a passing of a predetermined time period since receiving the indication of displacement and placing the input device in a second active mode of operation characterized by a second power consumption level less than the power consumption level. Additionally, the method includes periodically monitoring one or more of a plurality of touch sensors, receiving an indication of input from the one or more of the plurality of touch sensors, and placing the input device in the active mode of operation.

According to another embodiment of the present invention, a method is provided. The method includes placing a device in a first state of operation characterized by a first motion frame rate and a first touch frame rate, receiving a signal from a sensor indicating motion of the device, and placing the device in a second state of operation characterized by a second motion frame rate higher than the first motion frame rate. The method also includes determining a passing of a predetermined time period since receiving the signal from the sensor indicating motion of the device and placing the device in the first state of operation. The method further includes receiving a signal from a sensor indicating touching of the device and placing the device in a third state of operation characterized by a second touch frame rate higher than the first touch frame rate.

According to yet another embodiment of the present invention, a method is provided. The method also includes placing a device in a first state of operation characterized by a first motion frame rate and a first touch frame rate, receiving a first signal indicating activation of a touch sensor of the device, and placing the device in a second state of operation characterized by a second touch frame rate higher than the first touch frame rate. The method also includes determining a passing of a predetermined time period since receiving the first signal and placing the device in the first state of operation. The method further includes receiving a second signal indicating motion of the device and placing the device in a third state of operation characterized by a second motion frame rate higher than the first motion frame rate.

According to a particular embodiment of the present invention, a method is provided. The method includes providing an input device having a motion sensor, multiple touch pads, and a proximity sensor, placing the input device in a passive mode of operation, and monitoring the motion sensor to provide a motion value. The method also includes monitoring the multiple touch pads to provide a plurality of touch values and monitoring the proximity sensor to provide a proximity value. The method further includes determining an increase in the proximity value and placing the input device in an active mode of operation.

Numerous benefits are achieved by way of the present invention over conventional techniques. For example, embodiments of the present invention provide cursor control peripheral devices, such as computer mice, that provide increased functionality in comparison with conventional designs. Additionally, embodiments of the present invention provide methods and systems that reduce power consumption and increase battery life. Merely by way of example, multi-finger gestures that are natural and intuitive are provided using the multiple touch pads described herein. These and other embodiments of the invention along with many of its advantages and features are described in more detail in conjunction with the text below and attached figures.

BRIEF DESCRIPTION OF THE DRAWINGS

FIGS. 7A and 7B are block diagrams illustrating the operation of capacitive sensing.

FIG. 8 is a circuit diagram illustrating a capacitive sensing circuit with a clamp-down circuit.

FIG. 28B illustrates a gestures table describing results achieved based on various inputs according to an embodiment of the present invention;

DETAILED DESCRIPTION OF SPECIFIC EMBODIMENTS

The solid-state roller of the invention allows the roller to be placed on any shape housing. A trench or other convex shape could be used. Alternately, a concave shape could be used. A concave shape could be used for placement of the sensor on the side of a mouse, for activation by a thumb. The solid-state design described herein allows the sensor to be placed on any shape of surface, such as one that has curvature in two directions. Thus, it could simply track the contour of the mouse or other pointing device. This allows a pointing device to be designed for aesthetic or ergonomic reasons, and a solid-state roller can be added without requiring the shape to change.

Various shape implementation are covered in the invention. A curved trench with curvature matched to the hand creates a support surface that is lower than that of the two neighboring surfaces. This reduces the strain on the scrolling finger. Alternatively, the three middle finger tips rest over support surfaces having all similar heights, but the tip of the scrolling finger, when scrolling and leaving its original rest position, will travel over a trajectory that is below the plane defined by the two neighboring fingers, by entering a support surface in recess with this plane. For example, the scrolling finger tip follows a trajectory defined by the rotation of the finger around its middle joint.

Figure 1:
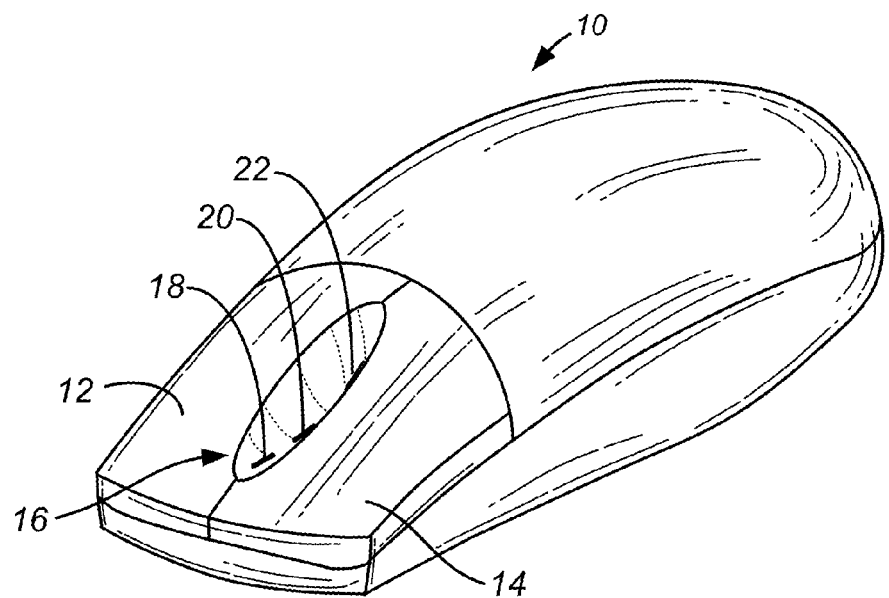
FIG. 1 is a perspective view of a mouse with a solid-state sensor trench according to one embodiment of the invention.

FIG. 1 is a perspective view of a mouse 10 having buttons 12 and 14. In-between the buttons is a convex area, or trench, 16 which can receive a user's finger. At the bottom of the trench are electrodes 18, 20 and 22. The movement of a user's finger either forward to back, or back to forward can be detected (as will be described later), and appropriate scrolling or other signals can be sent to a host computer. Alternately, other solid-state sensors than the electrodes shown could be used. For example, light emitters could be mounted on one side of the trench, with detectors on the other side, and the trench being transparent or translucent.

Figure 2:
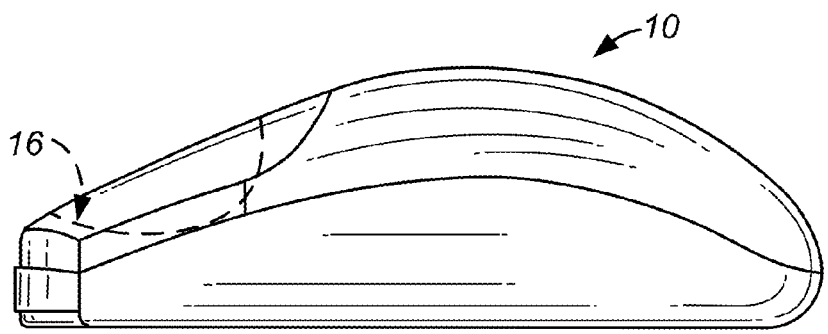
FIG. 2 is a side view of the mouse of FIG. 1.

FIG. 2 is a side view of mouse 10 of FIG. 1. Shown in phantom is the outline of the bottom of trench 16. As can be seen, the bottom follows a curvature, starting out at the front at a particular level, becoming deeper, and then becoming more shallow towards the back of the mouse. In one embodiment, this curvature traces the arc of a typical user's finger bending about the second knuckle while the hand is on the mouse. The second knuckle is the second knuckle away from the tip of the finger. The curvature in one embodiment takes into account the slight bending of the first knuckle as well, but with more than ⅔ of the bending movement (dictating the shape of the arc) coming from the second knuckle. In one embodiment, the arc of the trench is matched to the curving of the index finger or forefinger. This arc eliminates the need for the user to lift the finger up to activate a roller. Alternatively, the arc can be less steep, requiring a slight lifting of the finger as well, but less lifting than what is required for a mechanical roller or a solid-state touchpad on a surface without a trench.

Figure 3:
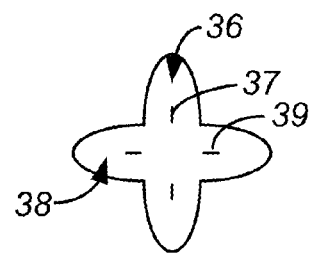
FIG. 3 is a diagram of a cross-shaped trench for horizontal and vertical scrolling in an embodiment of the invention.

FIG. 3 is a diagram illustrating a dual-trench arrangement in which a vertical trench 36 is provided for up and down scrolling movement, while a horizontal trench 38 intersects with it for horizontal scrolling movement. Electrodes such as electrodes 37 and 39 can be used to detect finger movement in both directions.

In another implementation, the finger rests in a trench wide enough to accommodate the finger, but not too wide in order to guide the finger in the direction of detection. Position detection is achieved with help of an array of light sources, or a single distributed light source, on one of the trench sides, and an array of light detectors located on the other side. Presence of the finger in the trench is detected from the reduced response in the detector directly facing the finger, or from combining responses from all detectors and determining by interpolation its minimum. Alternatively, a binary response from the light detector, either absolute ("light is above or below a given threshold, include hysteresis"), or relative with neighboring detector ("light is larger/smaller by a given factor than neighbor, include hysteresis") can be used. Similarly as in the previous electrode implementation, motion can then be computed based on the "on-off" and "off-on" transition timings with correct relative phase shifts.

Figure 4:
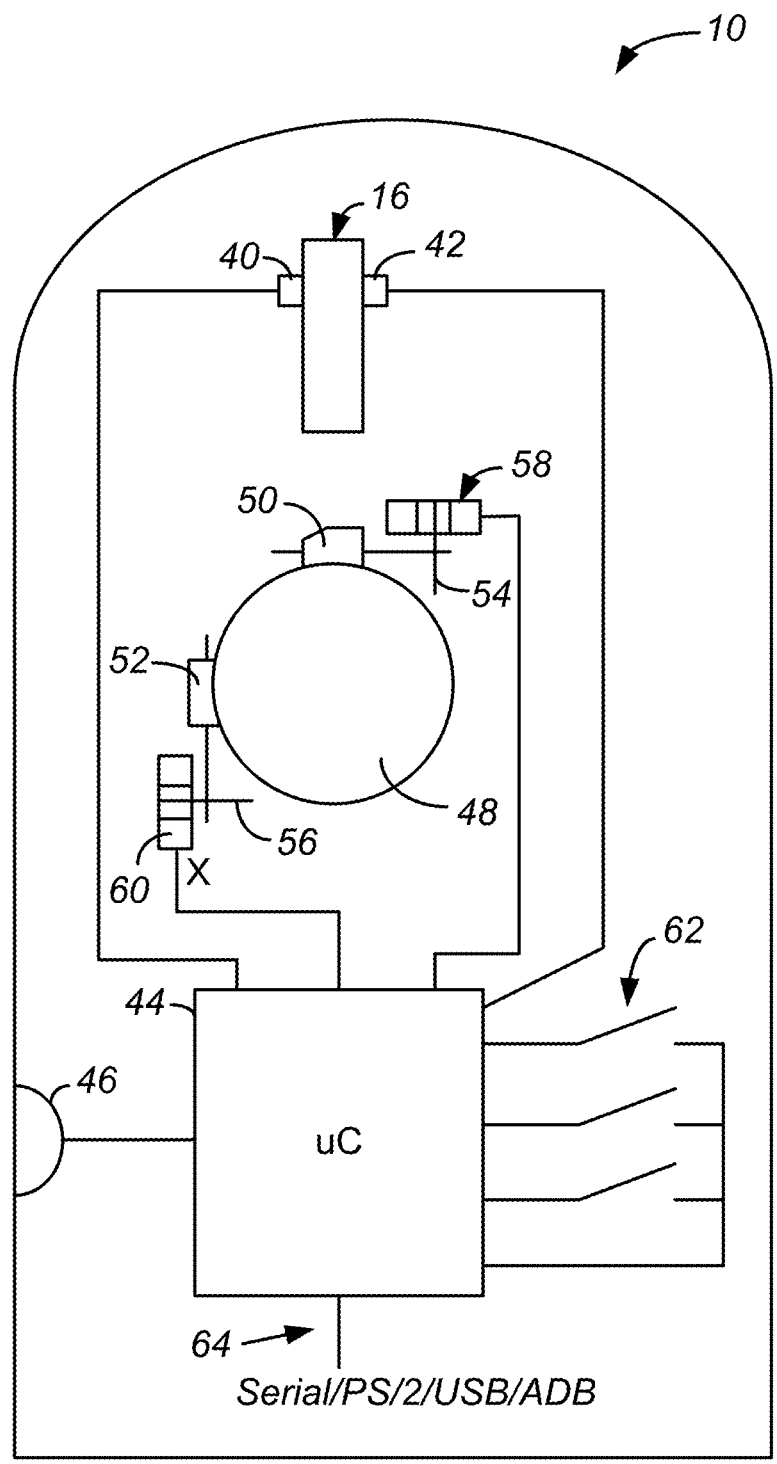
FIG. 4 is a diagram illustrating the pointing sensor apparatus in conjunction with the solid-state roller, and a speaker, in one embodiment of the invention.

FIG. 4 is a diagram illustrating some of the internal components of a mouse 10 incorporating the present invention. In the embodiment shown, trench 16 has a light-emitting diode(s) 40 on one side, and a multiple element photodetector 42 on the other side. By having the multiple element photodetector be able to detect separately when light impinges on different elements of it, the movement of a finger can be traced through a translucent or transparent trench wall. The LEDs are controlled by a microcontroller 44, which also monitors the detector signals.

The microcontroller also provides control signals to a speaker 46, for providing feedback sounds, such as a clicking sound, synchronized with the movement of a finger through trench 16. By including speaker 46 in the mouse, the latency of sending signals to the computer, and having the computer generate sounds through speakers connected to the computer, is avoided. This provides a more realistic, real-time feedback to the user. The desired clicking sound can be simply generated by the microprocessor using an appropriate square wave output to the speaker, which is simply a series of high and low output levels. The simplest implementation is a single high/low or low/high transition.

FIG. 4 also illustrates other standard components of a typical mouse, including a ball 48. Biased against ball 48 are rollers 50 and 52 which have attached slotted wheels 54 and 56, respectively. The slotted wheels pass between emitter/detector pairs 58 and 60, respectively. Alternately, another pointing sensor could be used, such as the optical sensors available from Agilent or others. Finally, FIG. 4 shows multiple switches 62 which are activated by the buttons on a mouse. The communications to a host computer can be done over a serial interface 64, or with a wireless transmission.

Figure 5A:
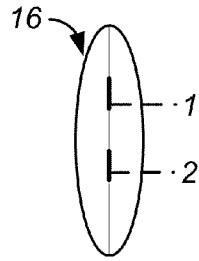
FIGS. 5A-5C illustrate different electrode arrangements according to embodiments of the invention.

FIG. 5A is a top view of trench 16 of FIG. 1, illustrating a two electrode embodiment. Two electrodes, designated 1 and 2, are shown. In this embodiment, the capacitive coupling of a finger to the electrode can be detected. By detecting which electrode is contacted first, it can be determined in which direction the finger is moving. This can be used to scroll or zoom in or out in the appropriate direction on the computer. Alternate uses of the movement of the finger may also be used.

Figure 5B:
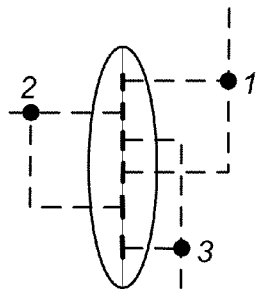

FIG. 5B shows an alternate embodiment using multiple electrodes in a repeating pattern. As shown, the first and fourth electrodes are connected together as electrode 1. The second and fifth electrodes are number 2, and the third and sixth are number 3. This arrangement provides for more preciseness, while limiting the number of electrodes, and thus the amount of wiring needed to connect to the electrodes on the sensor.

Figure 5C:
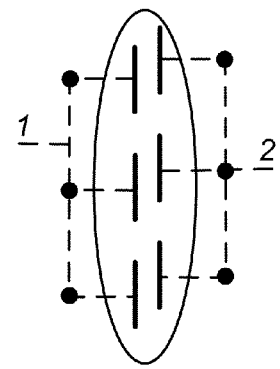

FIG. 5C shows yet another alternate embodiment, in which multiple electrodes are connected to only two wires, to form connected electrodes 1 and 2. As shown, the electrodes overlap in a vertical direction, so that a user's finger will contact electrode number 2 before leaving electrode number 1. The movement of the finger generates two signals in quadrature, from which the direction is determined from the sign of the phase shift. A more detailed description of such a quadrature detection can be found in U.S. Pat. No. 5,680,157. The varying amount of voltage detected on a particular electrode shows the direction of movement, and can support a more fine-tuned determination of where the finger is, especially in the area that would be between electrodes in the other embodiments. The inventors have discovered, however, that the embodiment of FIG. 5A, the simplest, is sufficient for many applications.

Figure 5D:
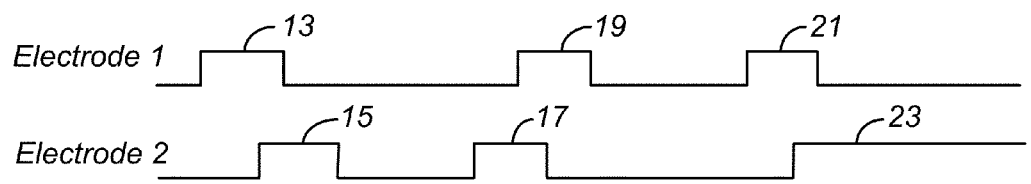
FIG. 5D is a waveform diagram of a sensor output for an electrode arrangement as shown in FIG. 5A.

FIG. 5D illustrates example waveforms generated from the touching of electrode 1 and electrode 2 of FIG. 5A. The waveforms would be the output of a comparator 34 in FIG. 6 below, for example. A first pulse 13 shows the finger in contact with the first electrode, with the rising edge corresponding to when the finger first touches the electrode, and the falling edge corresponding to when the finger leaves the electrode. The same applies for pulse 15, corresponding to the second electrode. Note that there is some overlap, and that the direction of finger movement can be determined from which electrode is contacted first (alternately, or in addition, which electrode the finger leaves last). Pulses 17 and 19 illustrate the finger moving in the other direction. Pulses 21 and 23 illustrate the finger remaining on the second electrode after moving, which can be used to provide a continued scrolling in the same direction.

In the embodiments above, the dedicated surface for sensing is typically located in place of the wheel, though other locations can be envisaged, for example below the thumb rest position. In one implementation, a number of sensitive electrodes are inserted, or molded over the sensitive surface. While the minimum number of electrodes is two, a larger number can be used in order to accommodate for a large sensitive area. In one implementation, finger movement indicative of the user desire to scroll is detected by an appropriate succession of on-off and off-on transitions in the electrodes, all with a relative phase shift consistent with the physical locations on the surface. In addition, speed constraints can be enforced by measuring the rate of electrode transitions, allowing for example, the discarding of excessively slow scrolls while improving on reliability, or allowing the application of larger document scrolls for movements at large speeds. The electrodes shape and spacing are matched to the finger dimension for comfort and detection robustness.

Connecting the electrodes with a period N creates a spatially periodical sensitive structure allowing a reduction in the electronics by a factor in the order of N, thus allowing larger sensitive surface at same cost. Typically, N is 3 to 4 but a value N of 2 is also possible if a gap is foreseen between each electrode pair and if there is a degree of spatial overlap within an electrode pair.

Figure 6:
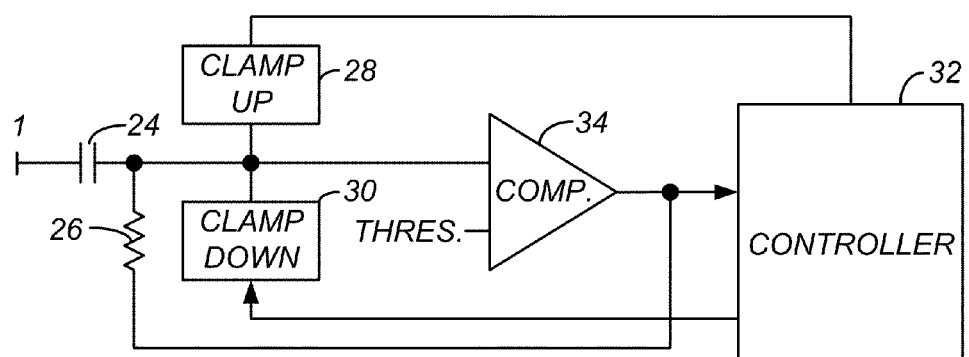
FIG. 6 is a block diagram of a capacitive detection circuit in one embodiment of the invention.

FIG. 6 is a block diagram of the capacitive detection circuit connected to each electrode. In the example shown, an electrode 1 is connected to a sensing capacitor 24 and a pull-up/pull-down resistor 26. In practice, the capacitor may be simply a gap in the wiring to the electrode. This gap can be created in a number of ways. A Mylar (Dupont's trademark for polyester foil) sheet can be used as a dielectric between the wiring connection and the electrode. This provides a well characterized dielectric, with a well characterized thickness, wedged between the conductor's terminal and the electrode, so that the resulting capacitance is well determined in spite of differences in tolerances during manufacturing. A flexible PC board could be used, with the flexible substrate itself causing the gap, i.e. the dielectric, between the electrode and the wiring. In one embodiment, the gap is about 50 microns, although the gap used can vary widely depending on the dielectric, etc. In one embodiment a wire is simply not stripped after it is cut, leaving its insulation intact up to the end. Then it is inserted through a hole in the electrode that has the same diameter as the insulation's external diameter. Or the electrode may be made of two pieces that are assembled around the insulated wire so that this is surrounded by the electrode. This makes a cylindrical or tubular capacitor at no material cost, where the wire jacket is the dielectric.

A clamp-up circuit 28 and clamp-down circuit 30 allows the node to be connected to the supply voltage or ground, respectively. These clamp circuits are under the control of a controller 32. The controller can thus clamp the voltage low, and then measure the time for the capacitor to charge up. Alternately the voltage can be clamped high, and then, after releasing the clamp, the time for the voltage on the capacitor to discharge can be measured. The voltage on the capacitor is provided as one input to a comparator 34, which compares to a voltage threshold, and provides an output to controller 32. The operation of the circuit and the theory behind it will be described in more detail below. Other implementations are possible, rather than using discrete components, such as an ASIC or the standard I/O of a microcontroller having a built-in comparator, or even using the inherent voltage threshold level of one of its input buffers.

In one embodiment, the driver for an I/O pin in a microcontroller can be used as a clamp-up or clamp-down circuit. An input buffer of the microcontroller could be used as the comparator. Such a design may not be as accurate, but could be sufficiently accurate, and would reduce the number of components and thus the cost. The comparator could be any circuit which performs a comparing function, including an appropriately configured amplifier. The comparator need not have two inputs, but could use an internal node for the threshold.

FIGS. 7A and 7B illustrate the conceptual operation of an embodiment of the capacitive detection of the present invention. A capacitive sensor is generally intended to detect the presence of an object when it is closer to a given distance, i.e. when either the capacitance of one electrode to the earth ground or the mutual capacitance between two electrodes of the sensing circuitry reaches a given value (threshold).

This working principle is less practical when it comes to implement a touch sensing function. The threshold would have to be carefully adjusted so that it would be reached at the same time as the finger touches the surface of the sensor. Therefore an easier approach can be adopted where the contact of the finger leads to a clear step in capacitance, much easier to detect, possibly without any adjustment.

The solution in one embodiment of the invention consists in building a galvanic sensor, shown in FIGS. 7A and 7B, where the finger comes in contact with one armature of a built-in sense capacitor 66, thus pulling it to the earth ground through the existing body to ground capacitance 68 that comes in series (contact is illustrated by "switch" 72, representing contact by a user's finger). Provided that the built-in capacitor has a much lower capacitance than the body to ground coupling (which ranges from 100 to 500 pF), the contact can easily be detected by a capacitive sensing circuitry 70, in the form of the sudden "apparition" of the built-in capacitor when the user touches its external armature. The rest of the time, when nothing touches the galvanic sensing area, the built-in capacitor remains "invisible" for the rest of the electronics. Please note that the sensing capacitor preferably is as close as possible to the sensing electrode, so that no significant parasitic capacitance is present between the discrete capacitor and the electrode, which would make the sensing capacitor "always visible"

thus ruining the touch sensing function. In one embodiment, the "discrete" capacitor 66 is simply a gap within the connection from the electrode to the circuit board containing the sensor circuit 70.

There are several ways of making capacitive sensing circuitry 70, from the simplest and cheapest RC charge or discharge time measurement to the most complicated tuned oscillator or filter system. One simple embodiment uses a free running RC oscillator where C is the sensing capacitor and a microcontroller repetitively counts the oscillation periods that occur during a given time window. A decrease in the number of counted periods by at least a given value means a finger has been placed on the electrode, while a minimal increase of accumulated counts is interpreted as the finger having been released from the electrode. No adjustment is needed; only the minimal difference of counts is to be set in accordance with the value of the capacitor used as the sensing element.

Another embodiment, instead of relying on RC exponential charging, uses a current source instead of a resistor, to give linear voltage ramps. With linear voltage ramps, a dual-ramp compensation scheme can be effective (see discussion below). A linear ramp allows compensation for large perturbations, and allows for more flexibility in threshold distance from the starting voltage.

Another embodiment uses an inexpensive solution, although this unfortunately suffers from bad noise immunity, especially against mains supply, which may be present in a large amount on the human body we want to detect. These low frequency signals are not well drained to earth ground through the 100 to max. 500 pF of the body to ground capacitance. We therefore prefer to get rid of the low frequency noise interference as much as possible, which will be described below.

In order to be able to implement these noise rejections we use a microcontroller, thus finally rending the simplest solution as effective as the most sophisticated ones, but still cheaper.

Basically, the embedded algorithm compares the RC time discharge to a reference time threshold in order to determine whether a finger is present or not. C is the sum of the inherent parasitic capacitance and the sensing capacitance, while R is the pull-up or pull-down resistor that drives the sensing line. The time threshold is automatically readjusted each time after the finger is detected as put on or released from the sensor, in order to compensate for the parasitic capacitances (which do not vary with the finger present or not). Only the time difference—the function of the minimal difference in capacitance we want to detect (4 pF or more)—is hard coded. Thus the system needs no factory adjustments.

FIG. 8 illustrates the principle used in an embodiment of the capacitive sensor 70 of the invention. FIG. 8 shows the elements of FIGS. 7A and 7B, with the galvanic contact switch 72 being the contact electrode 76 and finger 78. Sensor 70 includes an optional protection resistor 80 in series to an input node 81 of a comparator 82. Node 81 is clamped to ground via a switch 84 for initialization. When switch 84 is open, node 81 is charged through pull-up resistor 86. This charging is done in a time determined by the time constant of resistor 86 and the capacitances 66 and 68, along with the parasitic capacitances as shown. In addition to parasitic capacitance 74, a parasitic capacitance 88 is shown. The threshold at the second input of comparator 82 is set to two thirds of the supply voltage, Vcc. FIG. 8 also shows protection diodes between ground and node 81, and between Vcc and node 81, respectively. Other thresholds could be used depending on the embodiment. ⅓ and ⅔ are only illustrative. If the thresholds are the same amount above and below the low and high supply voltages, the same time period can be achieved for discharging and charging. However, the thresholds could be different amounts from the supply voltages, and simply require an adjustment to take into account the difference in the discharge and charge times.

Figure 9:
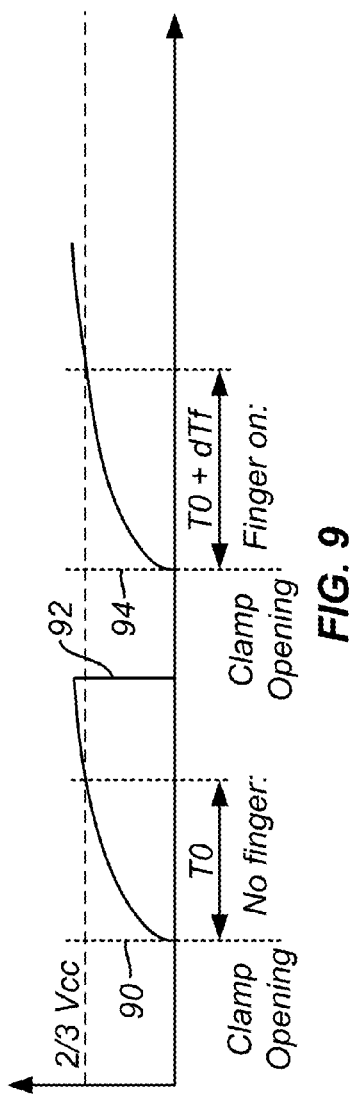
FIG. 9 is a timing diagram illustrating the operation of the circuit of FIG. 8.

FIG. 9 illustrates the timing for both a no finger condition, and a finger condition. Clamp 84 is first closed, to bring the voltage down to ground, or zero. When the clamp is opened at a time 90, node 81 charges up to the ⅔ threshold within a time T0. Node 81 is then grounded again at a time 92, and the switch is opened again at a time 94. At this point, a finger is on, adding capacitance, and lengthening the time required for the threshold to be reached to time T0+dTf.

Figure 10:
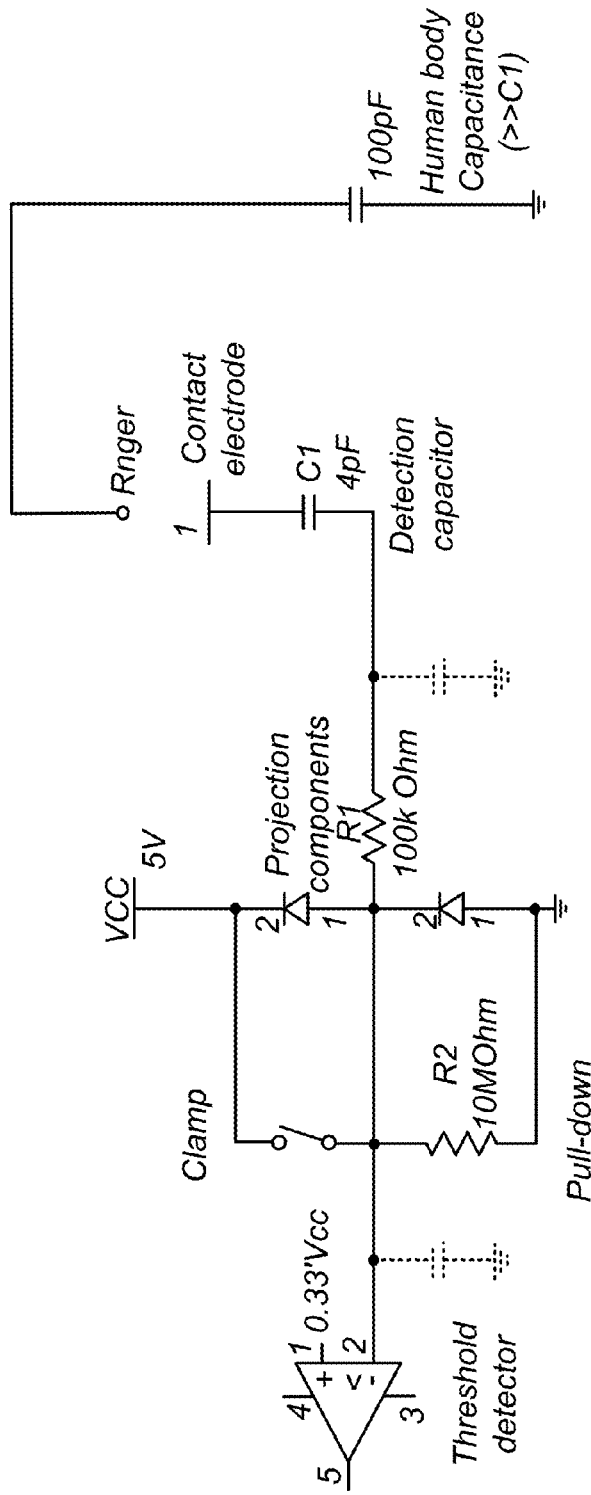
FIG. 10 is a circuit diagram illustrating a capacitive sensing circuit with a clamp-up.

FIG. 10 illustrates a similar circuit, but instead is showing the amount of time required for an input node to the comparator to be lowered from a high voltage to below a threshold. The threshold here is one-third of the supply voltage Vcc. In this example, the node is clamped to the supply voltage, and then is allowed to discharge to ground through a resistor R2. Otherwise, the circuitry is basically the same as that shown in FIG. 8, including the use of protection diodes between ground and node 81, and between Vcc and node 81, respectively.

Figure 11:
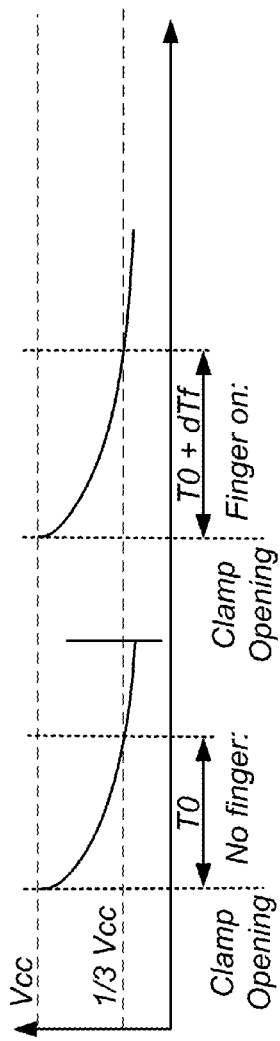
FIG. 11 is a timing diagram illustrating the operation of a circuit of FIG. 10.

FIG. 11 illustrates the timing with no finger and with the finger, showing again that a longer time is required to discharge the capacitance when the finger is on the sensor.

Figure 12:
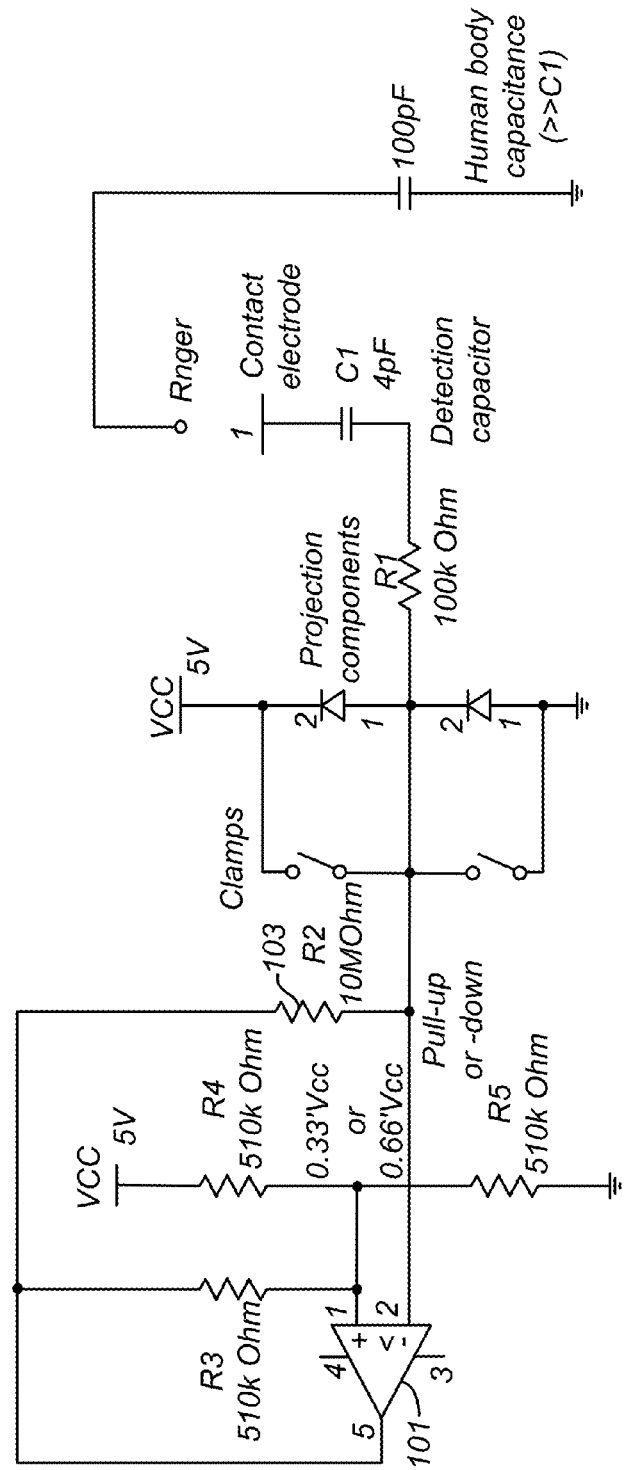
FIG. 12 is a diagram of a capacitive sensing circuit having both clamp-up and clamp-down capability.

FIG. 12 illustrates essentially a combination of the two approaches of FIGS. 8 and 10. Since the output of comparator 101 will either be high or low from the previous cycle, this output can be used to both be the source for pulling up (logic 1 output) through resistor 103, or pulling down (logic 0 output) through the same resistor. Also, the same output can be fed back to set the threshold, using resistors R3, R4 and R5. The threshold is set to 0.66 Vcc for a logic 1 output, and to 0.33 Vcc for a logic 0 output, using the same resistors.

The arrangement of FIG. 12, shown in more detail in FIG. 16 below, uses two clamps, allowing the capacitor to alternately charge up from ground, or discharge from the supply voltage. By using both, interference, such as from the power supply frequency, can be reduced, as explained below.

Figure 13:
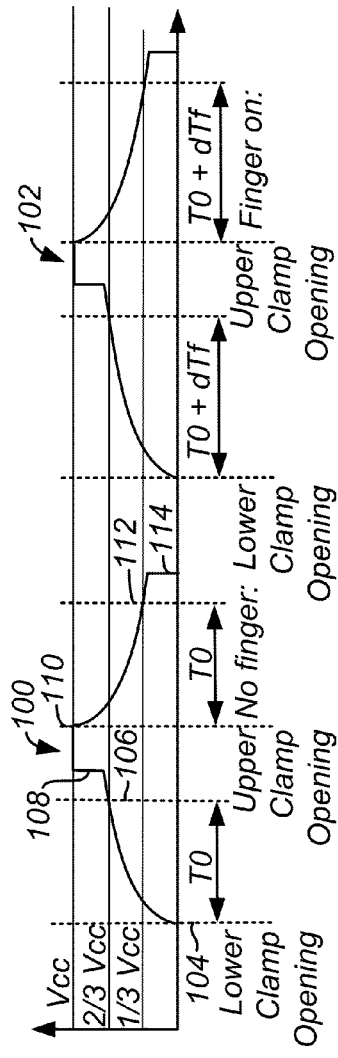
FIGS. 13, 14, and 15 are timing diagrams illustrating the operation of the circuit of FIG. 12.

FIG. 13 illustrates a capacitor charge and discharge cycle with no finger (100), and a charge and discharge cycle with a finger on the contact electrode (102). With no finger, the input node to the comparator is clamped to ground, and the lower clamp is opened at a point in time 104. The capacitance charges up until it crosses the upper threshold at a point in time 106, triggering the comparator output. Subsequently, the node is clamped high at a point in time 108, and then the clamp is opened at a point in time 110 to provide a discharge cycle. At time 112, the lower threshold is crossed, again triggering the comparator output. The voltage is then clamped down to zero again at a point 114, and the cycle repeats. During the second cycle illustrated by curves 102, a finger is on, and the times will be different, resulting in a longer charging time and longer discharging time. In one embodiment, cycle 102 is two milliseconds after cycle 100. Although T0 is shown as the same for the rising and falling (charging and discharging) times, this is not necessary.

Figure 14:
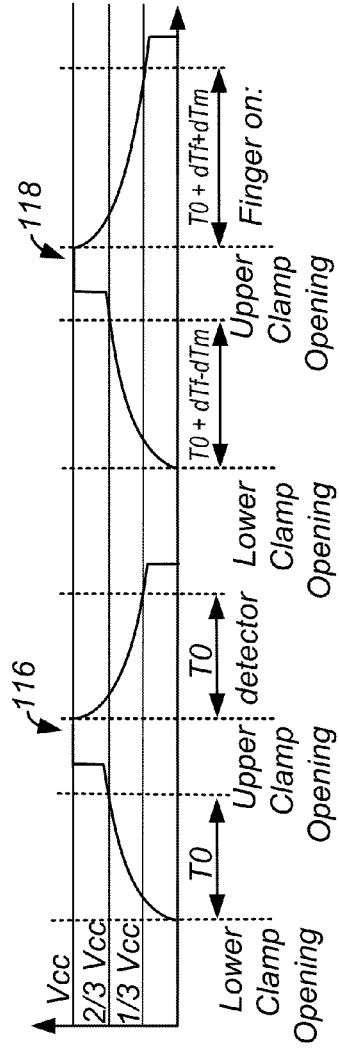

FIG. 14 illustrates a curve 116, similar to the curve 100, when no finger is on the electrode. Curve 118 illustrates a finger on, with the addition of noise interference represented by dTm. Thus, as shown, the charge up time will be T0+dTf−dTm, where T0 is the time without a finger, dTf is the additional time caused by the finger, and dTm is the noise interference. During a discharge cycle, the components are the same, except in this instance the interference is an additive term. Thus, by combining the two and using a sum result, the noise will cancel out. If the delay from the rising to the falling ramp is short compared to the period of the main power supply frequency, the interference will be the same on both ramps.

Figure 15:
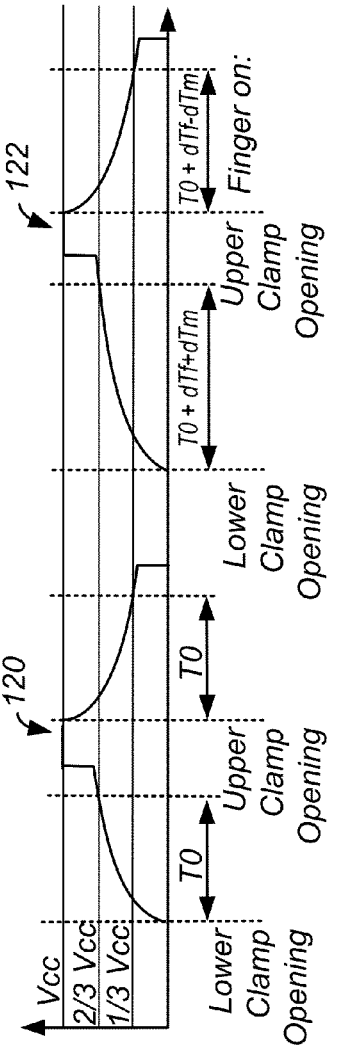

FIG. 15 illustrates another example, again showing a curve 120 with no finger, and a curve 122 with the finger on. In this instance, the noise is additive during the capacitive charging, and subtractive during capacitive discharging, with the same effect of canceling out when the two are combined.

Figure 16B:
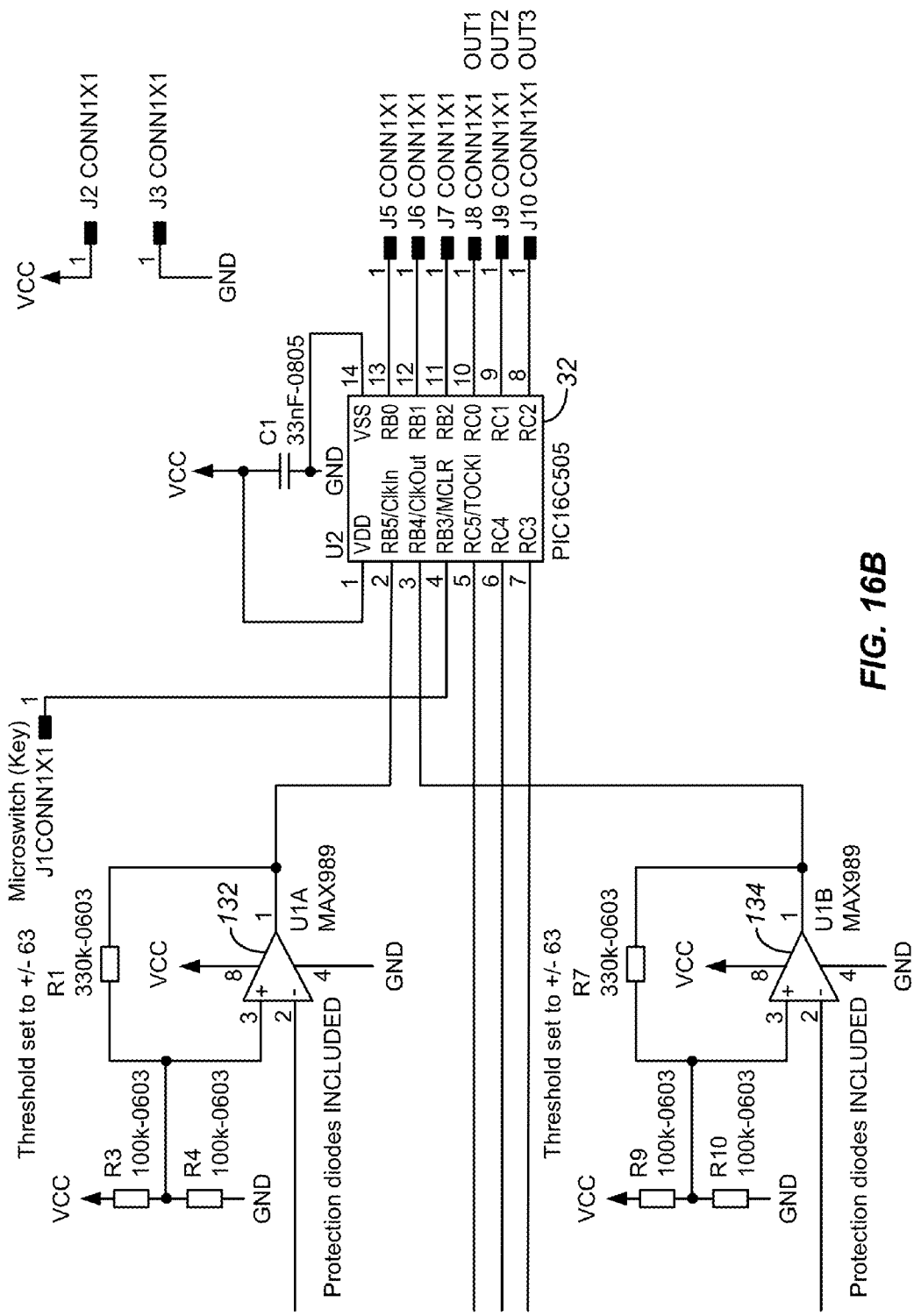
FIG. 16 is a diagram of a capacitive sensing circuit according to an embodiment of the invention.

FIG. 16 is a circuit diagram illustrating a capacitive sensing circuit, such as shown in block form in FIG. 4 and in FIG. 12. FIG. 16 has two inputs, 130 and 131. These correspond to two separate electrodes, each with their own capacitance connected. Input 130 is connected to one input of a comparator 132, while input 131 is connected to an input of comparator 134. Each of the comparators provides an output to microcontroller 32. The other input of each of the comparators is connected to a resistive circuit for setting the threshold. The threshold is set using feedback from the output of the comparator. Thus, when the output of the comparator is a 1, the threshold will be set one-third below the supply voltage, or at a level of 0.66. When the output of the comparator is zero (with the output being determined by the last transition) the feedback puts the threshold at one-third above ground, or 0.33.

Turning to the first input 130, this is initially clamped low by an output from microcontroller 32 on line 136 through a resistor 138 and transistor 140. The same output line 136 is connected to a similar low clamp for electrode 131. When the low clamp is released, the capacitance connected to input 130 will charge up through a pull-up resistor 142 with a high level value on line 144 as output by controller 32. A similar pull-up resistor is used for the circuit for input 131. After the threshold is passed and the comparator toggles, the next cycle begins with the input 130 being clamped high through a control signal on line 146, through resistor 148 to transistor 150, which clamps input node 130 high. The same control line 146 controls a clamp-up transistor for the circuit attached to input 131.

Figure 17:
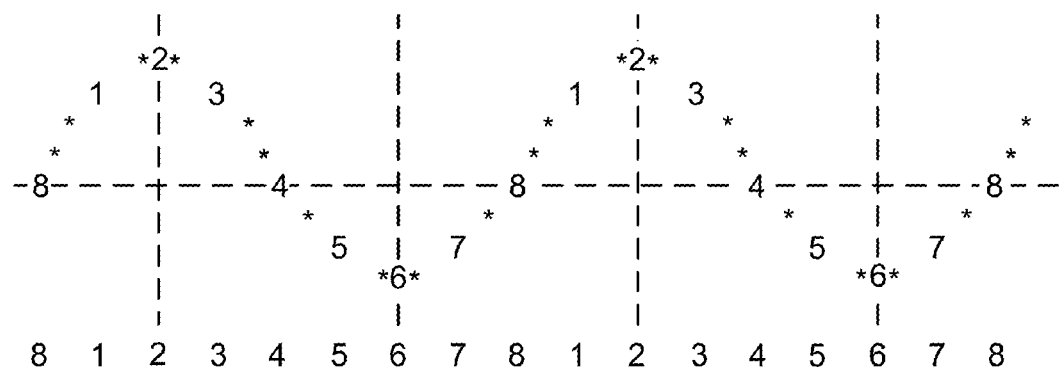
FIG. 17 is a timing diagram illustrating sampling in pairs during a period of the power supply frequency.

FIG. 17 illustrates a second aspect of this embodiment of the invention, which further reduces interference by how measurements are done compared to a frequency cycle of the main power supply, as illustrated. The successive (dual-ramp) time measurements are added and evaluated in groups in such a way that the remaining influence of the mains is further attenuated, by means of a naturally subtractive effect.

In order to achieve this, the evaluation is performed at a rate as close as possible to the mains period (or a plain multiple of its period) during which an even number of periodic time measurements are performed. When making the periodic sum or average of these individual time measurements, the influence of the mains is slightly attenuated pair by pair among the samples when added. This principle is illustrated in FIG. 17 for the case of eight measurements equally distributed in time during the mains period.

Thus, for example, measurement pairs 1 and 5 would be combined for a measurement value, rather than simply looking at 1 or 5 alone. Since 5 is at a negative portion of the main supply frequency cycle corresponding to the positive portion of sample 1, the combination should make the contribution from the interfering power supply zero. Similarly, by picking samples 2 and 6, 3 and 7, or 4 and 8, the interference from the main power supply is further canceled out. This interference in particular can be picked up by the human body and reflected in the capacitance generated by the finger contact.

The average mains period is taken as 18 ms (EU 20 ms & USA 16.67 ms). It covers 9 samples, but one is the first of the next evaluation period, therefore 8 samples (four pairs) shall last 15.75 ms. Thus, in the case of eight measurements per mains period, the sampling period is 2.25 ms.

As for the evaluation rate, it may be faster than one per mains period in order to improve the reaction time of the sensing elements. As long as each evaluation covers the mains period, it may well be performed more often than once per mains period, in fact it can be done up to each time a new measurement is performed (sliding window principle).

Figure 18:
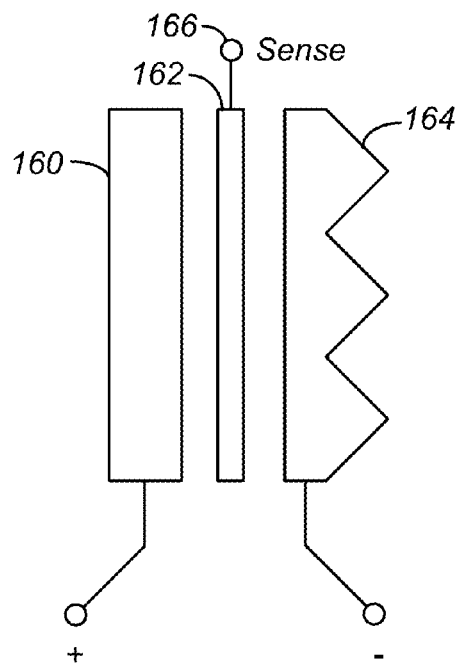
FIG. 18 is a diagram of an alternate sensor with a single-ended, zigzag electrode.

FIGS. 18-23 illustrate another embodiment of an electrode for sensing finger capacitance according to the invention. FIG. 18 shows three electrodes, 160, 162, and 164. Electrodes 160 and 164 are provided with positive and negative signals (signals in phase opposition), from which the electrode 166 can sense more or less of each one, as a function of the finger's position. Sensing is done on a node 166 connected to electrode 162. Electrode 164 has a sawtooth on one side, producing a modulated electrode. In the example of FIG. 18, this sawtooth is one-sided.

Figure 19:
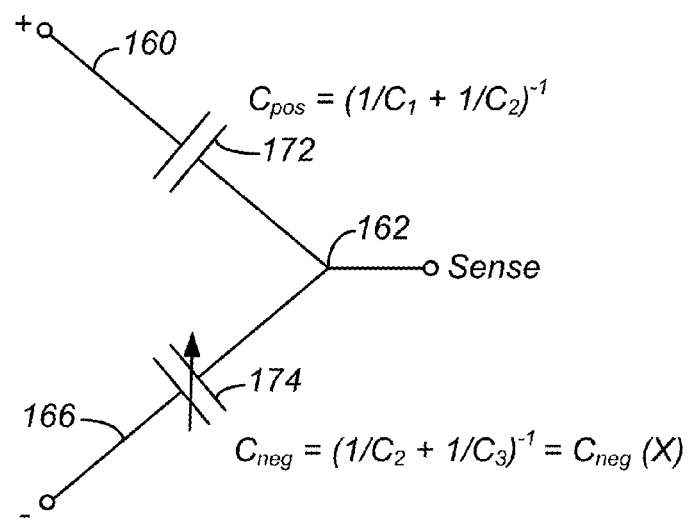
FIG. 19 is an equivalent circuit for the embodiment of FIG. 18.
Figure 20:
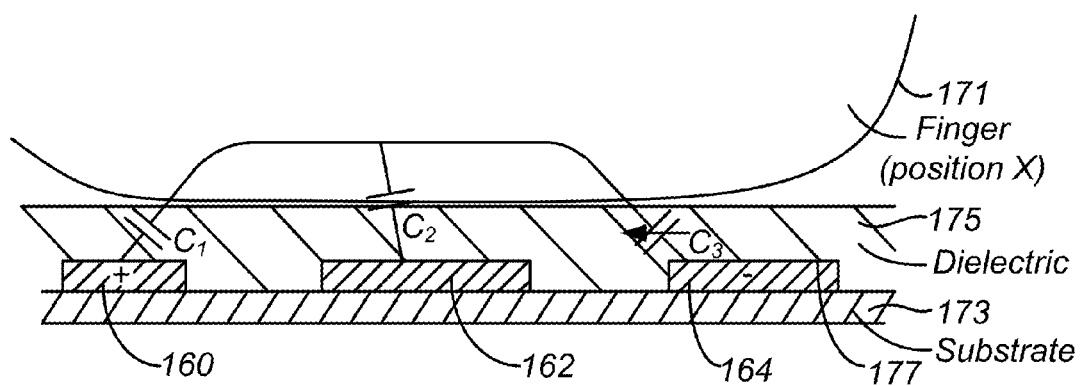
FIG. 20 is a cut-away, cross-sectional view of a finger on the electrodes of FIG. 18.

FIG. 19 shows the equivalent circuit diagram, with two capacitors 172 and 174, whose value is varied by the location of the finger. By measuring a current or injected charge into the sense node, the imbalance of the capacitance can be determined with positive and negative signals that are 180° shifted. Referring to FIG. 20, a cut-away view is shown of a finger 171 with capacitances C1, C2 and C3 to electrodes 160, 162 and 164, respectively. The electrodes are on a substrate 173 and are covered by a dielectric 175. The shown capacitances combine to form capacitances 172 and 174 as shown by the formulas in FIG. 19. A dotted line 177 in FIG. 20 illustrates the varying width of electrode 164 due to its sawtooth shape.

Figure 21A:
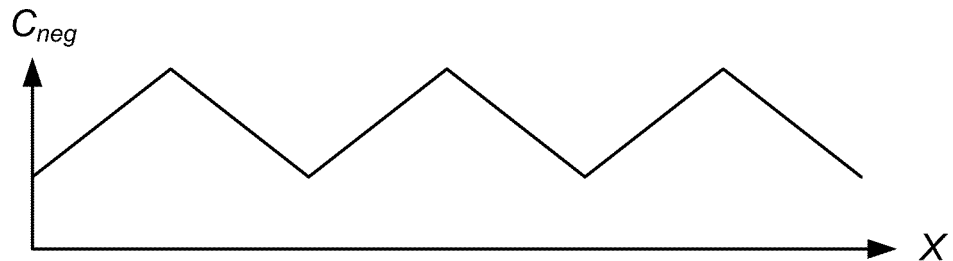
FIG. 21A-C are timing diagrams illustrating the operation of the circuit of FIG. 18.
Figure 21B:
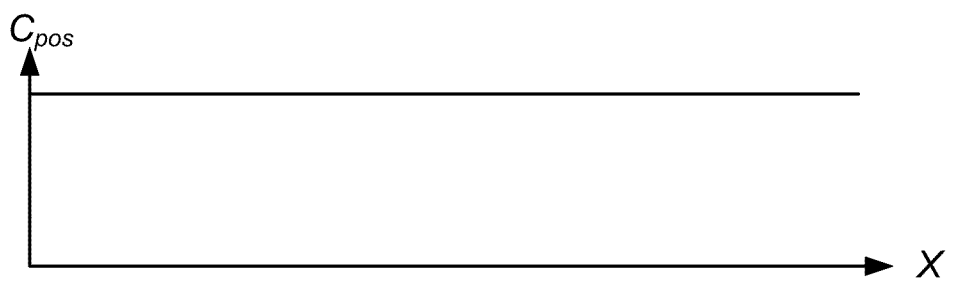
Figure 21C:
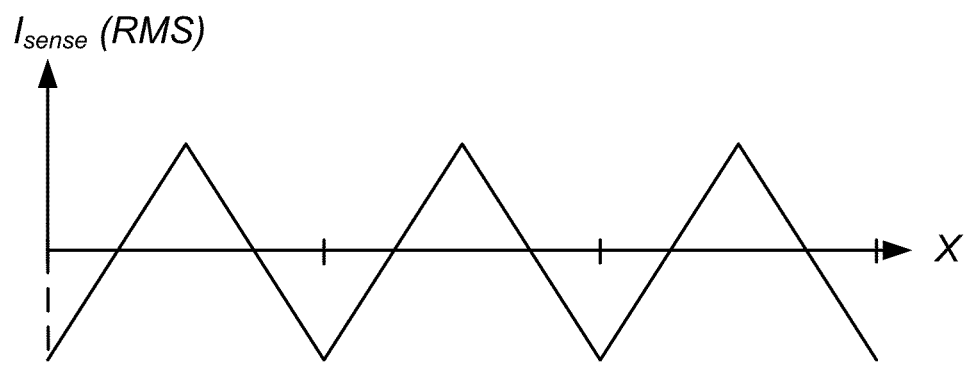
Figure 22:
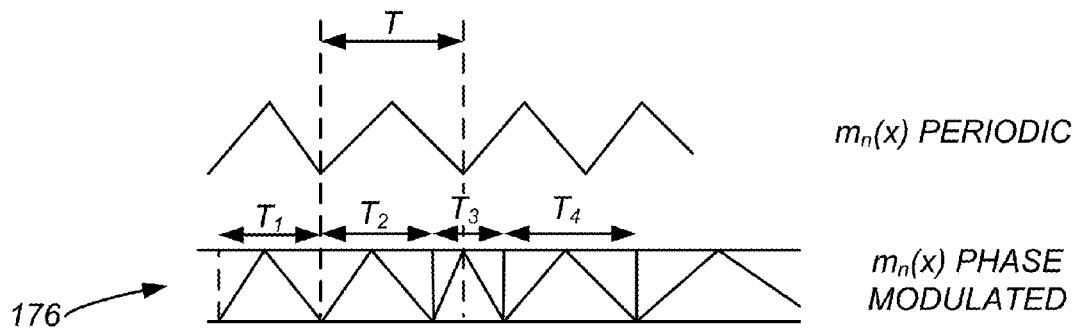
FIG. 22 is a timing diagram illustrating the use of phase modulation for the circuit of FIG. 18.

FIGS. 21A-C illustrate the modeling of Cpos and Cneg as a function of X (distance of movement of the finger). The amount of effective coupling when the finger partially covers the linear electrodes depends on the size of the finger. A purely periodic modulation with period T will not be detected if the finger dimension is a multiple of W. In order to avoid this rare effect, the modulation M(X) of the sawtooth is a phase modulated signal with ideally random modulation, or at a very low frequency, such as the phase-modulated signal 176 in FIG. 22. The sensing current can be measured synchronously, or any other method. By detecting zero crossings, peaks (maximum or minimum), an indication of the finger movement by movement of T is possible (or the phase-modulated value of T).

Figure 23:
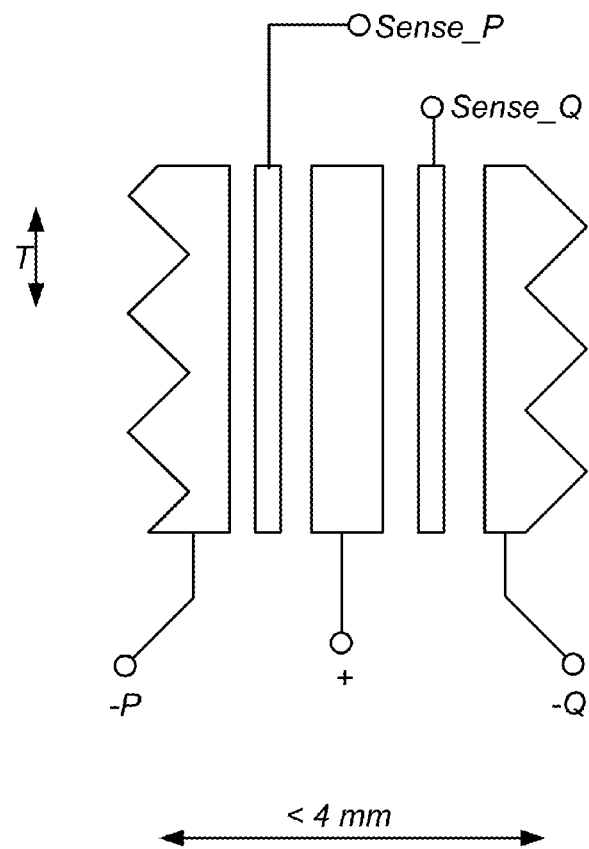
FIG. 23 is a diagram illustrating the embodiment of FIG. 18 using a quadrature structure.

Detection of the sign, or direction of finger movement, can be determined using a quadrature structure such as shown in FIG. 23. By quadrature decoding of the sensing signals, the sense_P and sense_Q signals can yield the movement direction. In the example of FIG. 23, with a separation of the outer electrodes of less than 4 mm, with T=1 mm, a 30 mm pad, of width 4 mm, could possibly obtain a resolution of 1%. Sense_P and sense_Q are excited and read out alternately in a time-multiplexed sequence in order to prohibit excitation and coupling from the other phase (Q, respectively P).

In another implementation, a single dimension resistive pad, using for example the force sensing resistance technology by Interlink, is used as the sensitive region. By computing the resistance between the current injecting node and the contact points at opposite ends of the pad, both position of finger and pressure of finger can be extracted. A change of position by a given, and possibly programmable, relative amount will trigger the document scrolling up or down by n lines. Finger pressure information can also be used for other functions such as scrolling factor, zoom factor, or others. For example, a movement with high pressure will result in a large document scroll, while a small pressure movement will scroll the document very slowly.

In a last implementation, optical detection is used to detect the finger movement. The finger is in contact with a transparent window while being illuminated by a light source. High-contrast fingerprints are obtained thanks to frustrated total internal reflection; the fingerprints are then imaged onto a linear photosensitive array. Cross-correlation between a reference (initial) fingerprint image and the currently measured fingerprint image indicates the amount of movement that occurred since the reference image was taken. When enough movement is registered, the currently measured fingerprint image is used as the reference image for the next cross-correlation computations. Alternatively, the photoarray/correlation system can be replaced by a position sensing device (psd), a component delivering the position of a light spot over a linear array. In this last implementation, the light spot is simply the portion of the finger that is illuminated by the light source and imaged onto the psd—position sensing device.

In all systems, the solid-state roller is enhanced with feedback. Tactile feedback is obtained by embedding either texture or periodical profile onto the sensitive area. The embedded texture/profile has amplitude and spatial frequency content matched to the 3D tactile perception of a finger moving at typical scrolling speed (3D relates to spatial perception+temporal—that is, moving—perception). Sound feedback is obtained by generating one or more "click" sounds whenever a movement creates a document scroll by one or more lines. The sound is provided through a speaker in the mouse itself, avoiding the delay involved in requesting the computer to generate sound. The sound can be generated by simply connecting an output of a controller to the speaker, with each rising or falling edge creating a click sound.

Similarly, visual feedback is applied by switching on a LED or other light source whenever a scrolling movement is registered. In one embodiment, a light used in the pointing device for decorative purposes can be flashed to indicate a notification to the user. One example would be an event being monitored by the user externally to the computer system, such as over the Internet, with the flashing light in the pointing device prompting the user.

Finally, in units implementing vibration/force feedback mice such as iFeel mice by Logitech, vibration/force feedback can be applied, typically in form of a vibration/force impulse of short duration, for each scrolling movement.

In one embodiment, the speed of a transition of the finger from one electrode to another is measured by the controller in the pointing device. Depending on the speed, the controller can send a report to the mouse driver in the host computer indicating 1, 2, 3 or 4 transitions. Thus, for example, a fast movement between just two electrodes can cause a 4 line scroll. By doing this determination in the mouse, rather than the driver software, only a single transition between two electrodes is needed to determine speed, rather than multiple transitions. This allows for faster response time to the desired scroll speed, and also allows the function to be implemented with only two electrodes on the mouse.

Fatigue generated when scrolling a large document can be avoided by using the scroll-repeat feature of the invention. After an initial scroll, defining both the scroll direction and amplitude, a scroll-repeat can be activated simply by letting the finger rest in the movement final position without lifting the finger at end of movement. Typically, the scroll-repeat function is activated after half a second latency time of letting the finger remain in this position. Both the latency and rate of scroll-repeat can be programmed to adjust to the user taste. Additionally, for implementations providing indication of finger pressure—the fsr pad or the pressure measuring electrode touch sensing—, the scroll-repeat rate can be continuously varied as desired by the user, under control of its finger pressure, until the scrolling finger is released. In one embodiment, the scroll repeat function is implemented in the controller in the pointing device. Upon detection of a scroll movement followed by the finger resting on an electrode for more than a threshold amount of time, the controller will continuously provide scrolling reports to the computer.

All of the above solid-state implementations of a roller improve on the current roller wheel in that they offer a better robustness to dirt and shocks. Some implementations also offer a very compact subsystem allowing new form factors and ergonomic shapes. The sensitive surface is designed so that the finger is guided over a trajectory allowing reduced strain, thus allowing for extended usage of the scrolling function. Fatigue can be further reduced by activating the scroll-repeat function with rate controlled by finger pressure.

Embodiments of the present invention provide a cursor control peripheral device (e.g., a pointing device such as, and also referred to as a mouse) that includes multiple touch zones. In the present specification, a mouse is used as an example of a cursor control peripheral device, but the use of the term "mouse" is not intended to limit the scope of the disclosure and it should be understood that these examples are also applicable to a wider range of cursor control peripheral devices. In one implementation, each touch zone includes an array of drive lines and sense lines organized in a mutual capacitance measurement architecture. Drive lines can be shared between touch zones, allowing a single multi-touch controller to control a plurality or all of the touch zones. According to some embodiments, power management designs are implemented using multiple touch zones in which touch and motion sensing are activated/deactivated based on activity detected from both touch and motion sensors, including, for example, an additional proximity detector. Embodiments of the present invention provide benefits not available using conventional techniques including the addition of touch functionality and gestures (e.g., utilizing one, two, three, or more fingers and/or a user's thumb or palm) on a mouse without sacrificing one or more mechanical attributes such as finger sculpted facets (typically utilized for user comfort). In some implementations, touch sensors, also referred to as touch pads, are utilized below each finger on a mouse. In other embodiments, multiple fingers are associated with one of the plurality of touch sensors.

Figure 24:
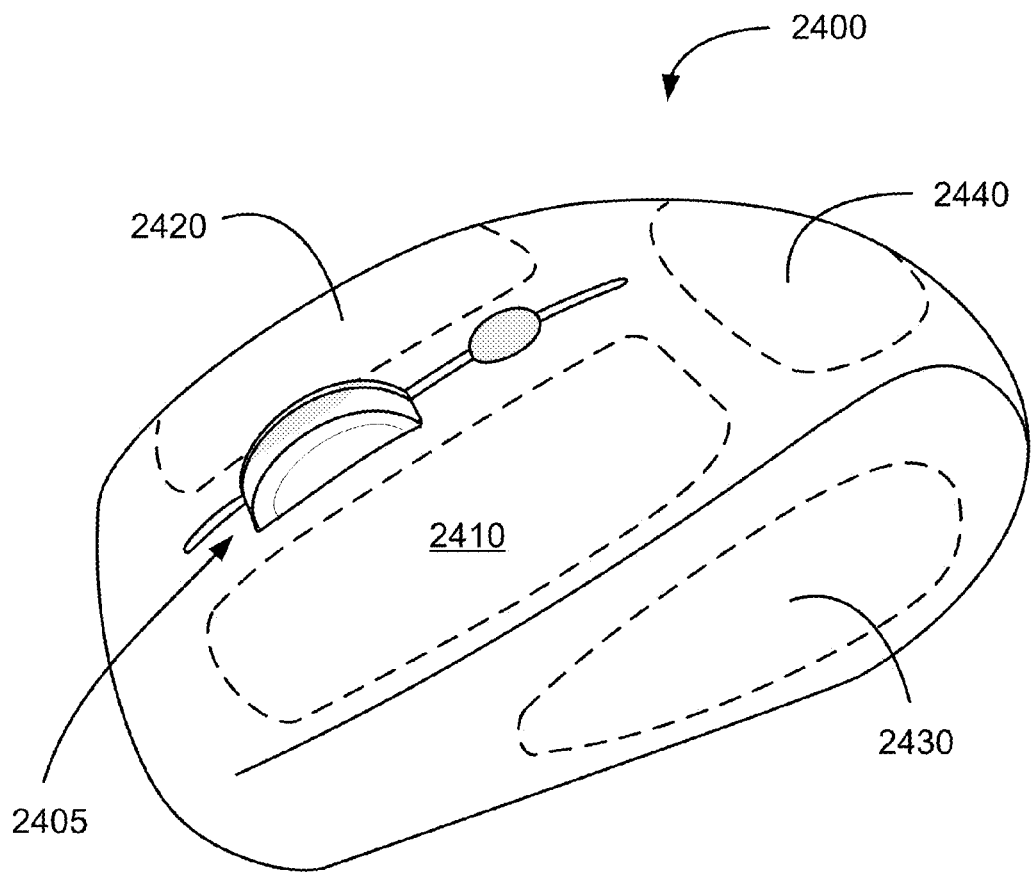
FIG. 24 is a simplified perspective view of a pointing device including a plurality of touch sensors according to an embodiment of the present invention.

As described more fully throughout the present specification, multiple sensor panels (e.g., in the form of one or more printed circuit boards and/or one or more flexible printed circuits) are associated with each key plate as well as below the thumb rest zone. Thus, embodiments of the present invention provide multiple touch zones on a single pointing device. FIG. 24 is a simplified perspective view of a pointing device including a plurality of touch sensors according to an embodiment of the present invention. As illustrated in FIG. 24, four different touch pads are utilized on the illustrated mouse. It will be appreciated that embodiments of the present invention are not limited to four touch pads, but can utilize fewer or a greater number of touch pads that the four illustrated in FIG. 24. Referring to FIG. 24, one touch pad is associated with (e.g., positioned under) the index finger, one touch pad is associated with the middle finger, one touch pad is associated with the thumb, and a fourth touch pad is associated with the palm of the user's hand.

According to some embodiments, the multiple (e.g., four) touch pads are each connected to a dedicated processing device (e.g., an IC chip mounted on a printed circuit board). In these embodiments, the processing devices associated with each of the multiple touch pads works in isolation and detects motion for its associated touch pad or sensor zone. In other embodiments, a fewer number of processing devices are used, with one or more touch pads sharing a processing device. In a particular embodiment, a single processing device or IC chip is used to detect motion of fingers/thumb on the multiple touch pads. In this embodiment, each touch pad or sensor zone is connected to a measurement printed circuit board (PCB) or a flexible printed circuit (FPC) including a touch controller IC. In some implementations, the measurement board and one of the touch sensors can be embodied in a single board (e.g., either a PCB or a FPC). These examples are not intended to limit embodiments of the present invention and other implementations in which M touch sensors communicate with N processing device, where N is less than M are included within the scope of the present invention. Thus, embodiments of the present invention utilize a single multi-touch IC to measure multiple touch zones. In one embodiment, as described more fully below, the drive lines of each touch zone are connected to the same drive output of the controller IC and are thus shared.

In a specific embodiment, the touch controller IC is a multi-touch controller IC using a mutual capacitance measurement architecture (also referred to as a projected capacitance touch controller). Mutual capacitance measurement is obtained by: a) rows electrodes are parallel line electrodes arranged in one dimension (e.g. "row") and are connected to the controller IC "drive" output pins. The drive lines are driven by a series of pulses, typically with each drive line pulsed in succession; b) sense lines are electrodes arranged in the other dimension (e.g. "column") and are connected to the IC "sense" electrodes. The sense electrodes are connected to the IC sense input pins, where the current injected by the mutual capacitance is measured, thus indirectly measuring the mutual capacitance. For projected capacitance touch sensors, the signal results from changing the capacitance coupling between rows and columns, that is, actually changing the measured current into the sense lines (illustrated in this example, by the columns).

Figure 31:
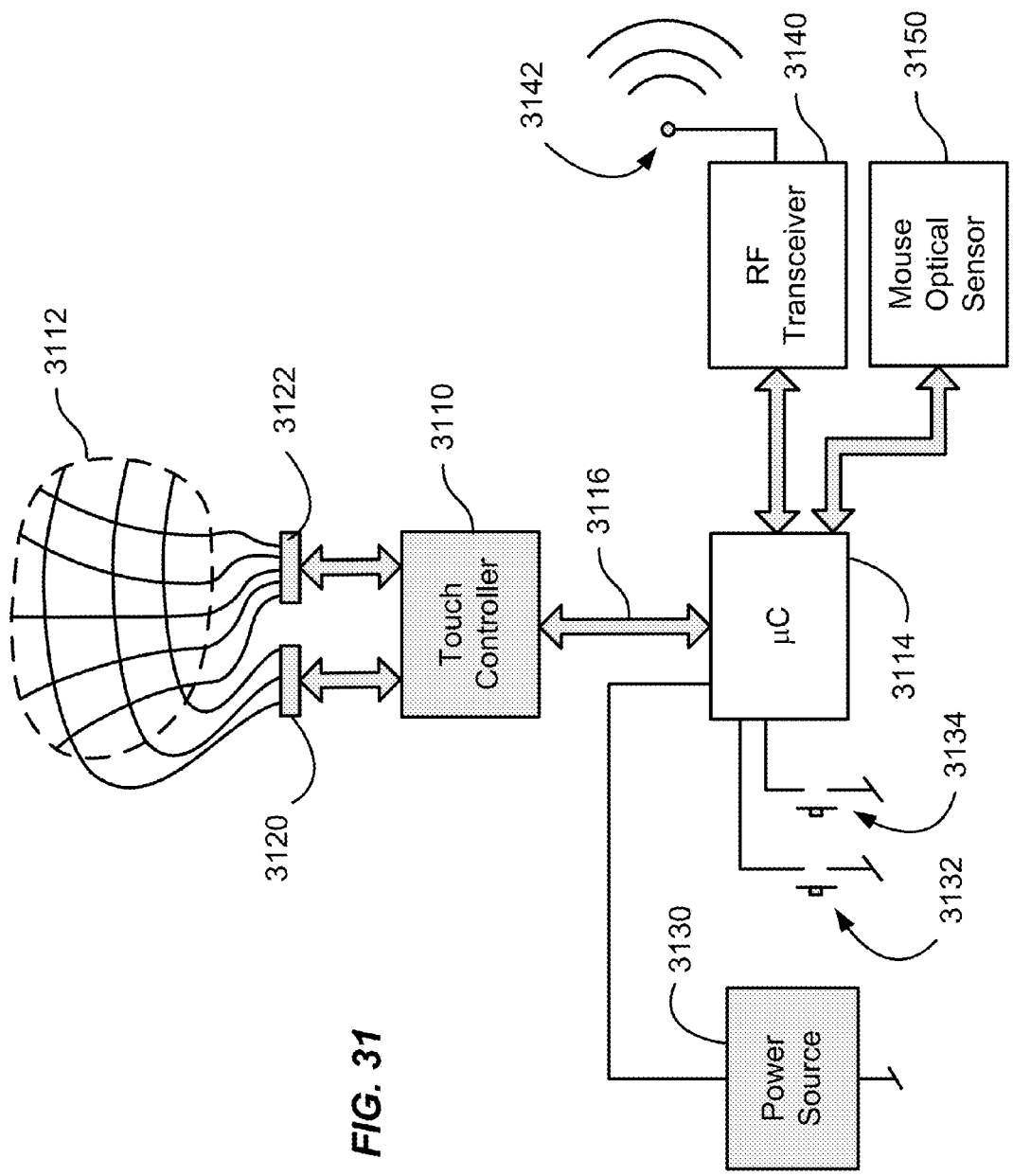
FIG. 31 is a simplified schematic diagram illustrating elements of a touch controller system according to an embodiment of the present invention.

FIG. 31 is a simplified schematic diagram illustrating elements of a touch controller system according to an embodiment of the present invention. As illustrated in FIG. 31, a single controller 3110 is utilized in conjunction with multiple drive and sense lines for the single zone touch sensor 3112. Thus, the embodiment illustrated in FIG. 31 is for a single touch zone while other embodiments are provided for multiple touch zones. The touch controller 3110 is an integrated circuit that can communicate with microcontroller 3114 via communication bus 3116. One of several communications protocols including SPI or I$^{2C}$ can be utilized.

The touch controller 3110 is operable to drive multiple drive lines through the drive lines bus and to sense multiple sense lines through the sense lines bus. A connector 3120 is used to connect the drive lines bus to the touch sensor 3112 and a connector 3122 is used to connect the sense lines bus to the touch controller. In the mutual capacitance setup illustrated in FIG. 31, the outputs of the touch controller are routed to each of the rows (i.e., three rows in the illustrated embodiment). By producing drive signals on the rows, it is possible to sense signals on the sense lines simultaneously through the mutual capacitance between drive and sense at the nodes.

Referring to FIG. 31, the microcontroller 3114 is in communication with a power source 3130, one or more buttons 3132 and 3134, a wireless communication system illustrated by RF transceiver 3140 and antenna 3142. Additionally, an optical sensor 3150 is utilized to detect motion of the mouse.

In an embodiment, the total number of sense lines associated with the IC are divided between the multiples touch sensors. For example, 9 drive lines+16 sense lines can be connected to a touch controller IC and be used to control four touch sensors (e.g., the four touch zones illustrated in FIG. 24) with: 9 drives lines each (shared) and 4 sense lines each (not shared). With a pitch of 5 mm between electrodes, each touch zone would be 45 mm×20 mm. In some embodiments, the electrode pitch is changed between touch zones, depending on the user requirements and/or the implementation details (for example, a left key plate could provide 2D panning functionality and would, therefore, be wider for in order to achieve this desired functionality). Other implementations can utilized differing numbers of drive and sense lines as appropriate to the particular application. It should be noted that although the above example, the touch zone is rectangular, this is not required by the present invention and other geometries are included within the scope of the present invention. For example, a subset of a rectangular touch sensor could be used or the touch sensor could modify the number of drive and/or sense lines as a function of position to provide other shapes with arbitrary geometries including oval, triangular, or the like.

Another aspect of the invention provides methods and systems to manage power in order to increase battery life. When not used, minimum power should be used to monitor lack of activity, and resume when activity is detected. For that purpose, several different implementations can be provided depending on the particular system design. The following options are provided by way of example and are not intended to limit the scope of the present invention. In a pointing device including an optical sensor (e.g., a mouse with multiple touch pads and an optical sensor, also referred to as a pointing sensor), methods and systems can be implemented in which one of the two sensor types is placed in a low power mode in response to lack of activity. In contrast with conventional systems utilizing a wake-on-touch approach, embodiments of the present invention utilize the detection of motion of at least one of a finger on one of the multiple touch pads or motion of the pointing device to wake the device. As an example, while a finger is positioned adjacent the touch pad with the mouse stationary, the mouse is in the low-power mode. When the user starts moving their finger across the touch pad in a scrolling motion, the micro-controller in the device will detect the finger movement, and by detecting this change of position of the finger, will trigger the touch pad micro-controller to transition into an active or high-power mode in which the mouse is typically operated at a higher response frequency or frame rate.

In a first embodiment, a capacitive proximity sensor is used, which can be independent of the touch controller or included in the touch controller. When a finger approaches the touch pad, the proximity sensor is able to detect the approach of the finger. Proximity sensors are quite suitable for power management since they are able to detect the proximity of a finger with very low operating current and still transition into the active mode (i.e., wake up) upon approach of the finger or other portion of a user's hand. The elements associated with the capacitive proximity sensor can either be a completely separate system with its own electrodes used to sense the hand/finger approaching or could use the drive lines, which are typically output lines, in a dual purpose mode as inputs for the proximity sensor. In this implementation, a drive line can be placed into a high impedance mode by the touch controller, in essence, releasing the drive lines in a sleep mode in which the outputs from the drive lines are inactive. While the drive lines are in a high impedance mode, an IC could be used as a proximity sensor connected to the inactive drive lines so that these drive lines would then become the electrodes (also referred to as sense lines) of the proximity sensor in their dual purpose functionality.

It should be noted that the power management techniques discussed herein are not only applicable to a mouse including multiple touch zones, but would also be applicable to a mouse having only a single multi-dimension touch zone. Thus, the power management techniques are not restricted to multiple touch zone pointing devices, but are also applicable to a mouse with a single touch zone. As an example, the use of the palm sensor can be implemented using a single multi-dimension touch zone. One of ordinary skill in the art would recognize many variations, modifications, and alternatives.

In some modes of operation, the capacitive touch sensors utilize a capacitance map including a baseline map that provides a capacitance as a function of position for the various nodes formed by the intersection of the drive and sense lines. The capacitance map can be considered as an image of the capacitance as a function of position. In a sleep mode, the frame rate is lowered. At the end of the frame time, for example, 400 ms, a new capacitance map is generated and compared to the baseline map. Changes in the capacitance map are detected and used an input to increase the frame rate, resulting in transition from a sleep mode to an active mode.

In another embodiment, the motion sensor is used to provide input for the mode transition, with the pointing device activating only on touch if motion has been detected (i.e., touch power is managed based on motion sensing alone). In this example, the touch sensors could remain in a sleep mode (e.g., a lower frame rate of operation) until the motion of the mouse is detected. As illustrated in FIG. 31, a motion sensor is illustrated as a mouse optical sensor. As described herein, the motion sensor can be utilized with the touch sensors to provide a wide range of functionality.

According to a third embodiment of the present invention, each of the plurality of touch sensors and the motion sensor(s) are managed independently to provide inputs for mode transitions. According to a fourth embodiment, one or more of the touch sensors (e.g., a touch sensor adjacent the user's palm) is used to initiate the transition from a sleep mode to an active mode. By focusing only on one or the touch sensors, for example, the palm, the systems is enabled to reduce the surface area over which detection is performed, thus limiting power consumption. In some embodiments, all or a subset of the touch zones are configured to support only a single touch point. In these embodiments, the single dimension or linear touch zones are characterized by a geometry such that they are not configured to enable two fingers to rest on a single finger rest surface. For these embodiments, a gesture is a combination of multiple linear or multidimensional (e.g., 2D) movements measured by each touch zone sensor. Additional description related to such linear and multidimensional movements in illustrated, for example, in FIG. 28A, in which the thumb has 2D movement using a 2D touch pad and the fingers have linear movement using linear touch pads.

Figure 30A:
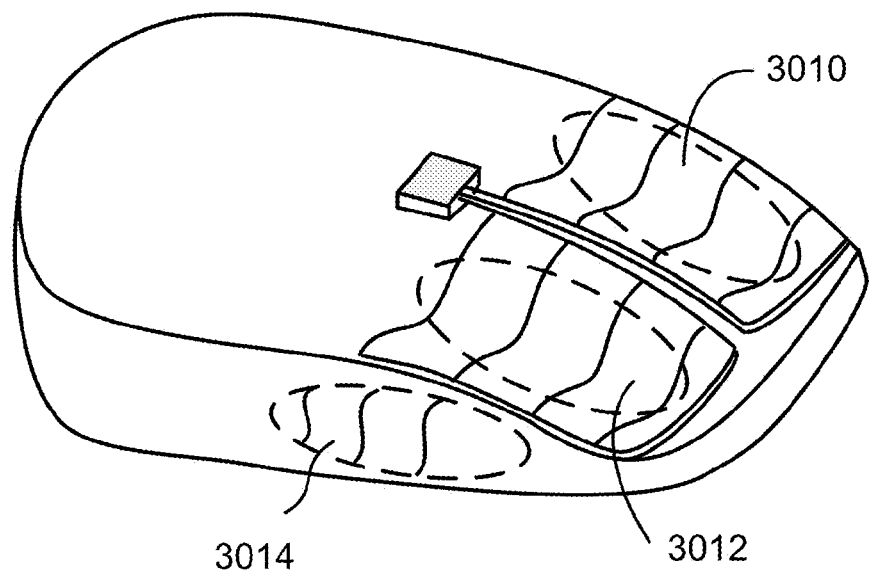
FIG. 30A is a perspective view of a pointing device including multiple touch zones according to an embodiment of the present invention.

FIG. 30A is a perspective view of a pointing device including multiple touch zones according to an embodiment of the present invention. As illustrated in FIG. 30A, multiple sensor zones 3010, 3012, and 3014 are provided on the surface of the pointing device. In some embodiments, the sensor zones or touch zones are fabricated with sculpted facets or scooped features to provide for finger comfort. The positioning of the touch zones as illustrated in FIG. 30A is suitable for receiving inputs from the fingers and/or the thumb of the user.

Figure 30B:
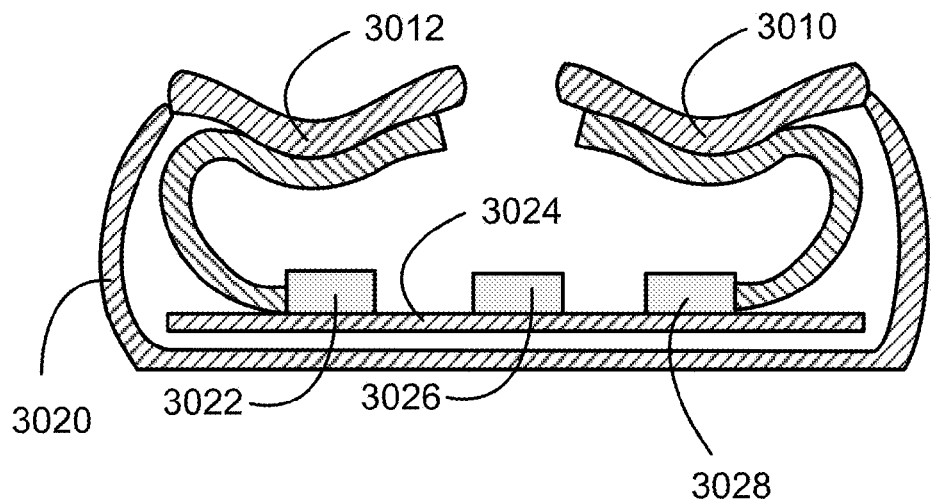
FIG. 30B is a cross-section view of the pointing device illustrated in FIG. 30A.

FIG. 30B is a cross-section view of the pointing device illustrated in FIG. 30A. The cross-section view illustrates that the one or more of the touch zones are disposed on an upper surface of the pointing device. Although only two touch zones 3010 and 3012 are illustrated in FIG. 30B, this is not intended to limit the scope of the present invention. The bottom of the housing 3020 provides a support surface for mounting of a number of system elements including a printed circuit board 3024. In turn, the printed circuit board provides a support surface for mounting of other system elements including a touch controller 3026 and one or more connectors 3022 and 3028. In the illustrated embodiment, connector 3022 is operable to provide drive signals to the touch zones and connector 3028 is operable to receive sense signals from the touch zones. Additional description related to the drive and sense lines is provided in relation to FIG. 31.

Figure 32A:
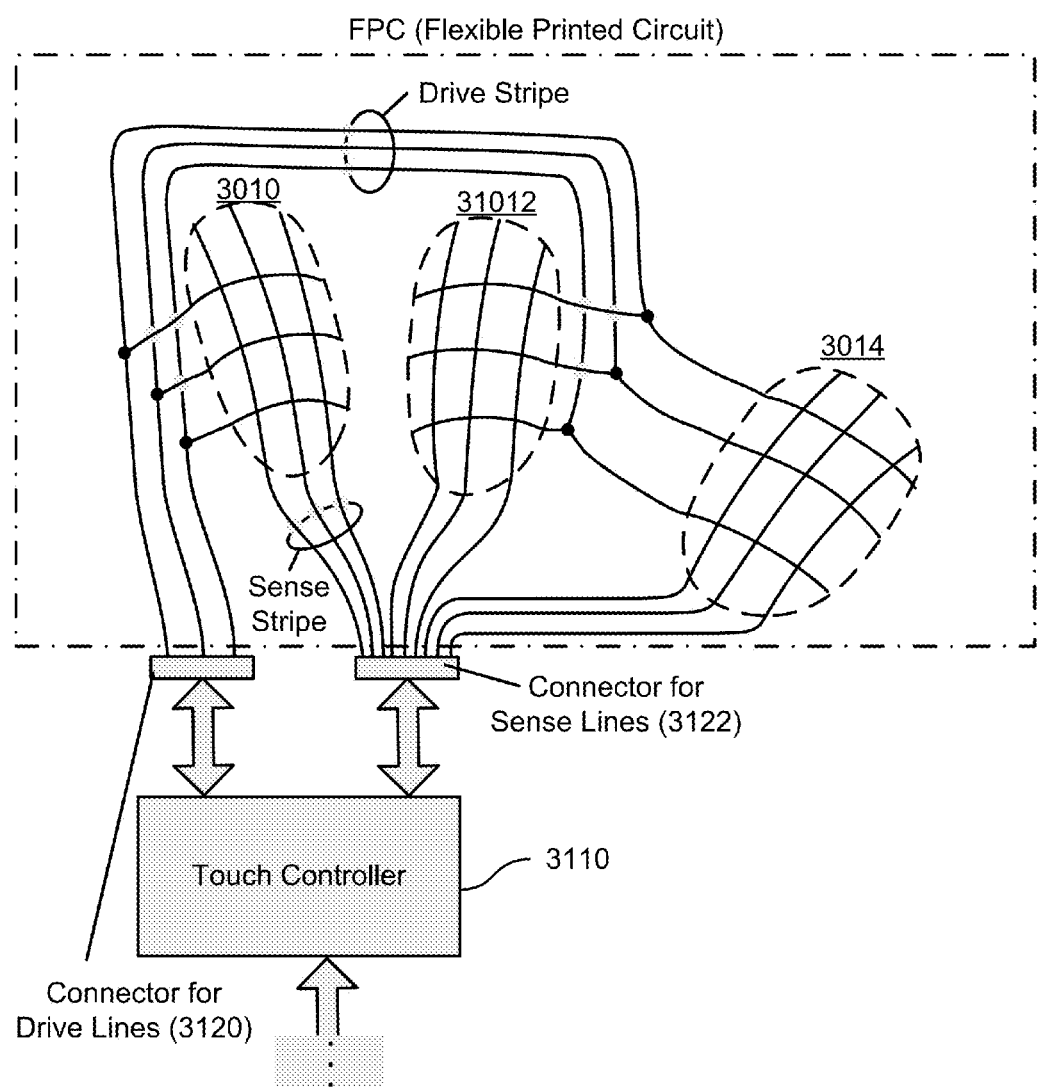
FIG. 32A is a simplified schematic diagram of elements of a touch sensor system according to an embodiment of the present invention.

FIG. 32A is a simplified schematic diagram of elements of a touch sensor system according to an embodiment of the present invention. In comparison with FIG. 31, the embodiment illustrated in FIG. 32 includes multiple touch zones connected to a touch controller. Thus, utilizing embodiments of the present invention in which multiple touch pads are implemented in the pointing device, such as a mouse, it is possible to provide features that are not available using a single touch pad. The sensor zones 3010, 3012, and 3014 (previously illustrated in FIG. 30A as touch pads) are connected to touch controller 3110 using a first connector 3120 for the drive lines and a second connector 3122 for the sense lines. Alternatively, drive lines and sense lines can share the same connector with the condition that capacitive coupling, from the drive lines to the sense lines and away from the touch zone itself, is minimized, for example, by defining 2 non-overlapping blocks. The sensor zones 3010, 3012, and 3014 are arrayed on a flexible printed circuit (FPC). In the illustrated embodiment, there are three drive lines shared between the three sensor zones and nine sense lines (three from each sensor zone). Of course, the particular number of drive and sense lines can vary depending on the particular application. The FPC provides for mechanical separation and independence for the various touch sensors, enabling them to be associated with different digits of the hand as illustrated in FIG. 30A. The various sensor zones can thus receive independent inputs for each finger.

As will be evident to one of skill in the art, the number of zones and positioning is provided merely by way of illustration. In one implementation, 4 cm of travel distance is provided for each finger, utilizing, for example, eight drive lines with a spacing of 5 mm between drive lines. Other spacings and numbers of lines can be used as appropriate to the particular application.

Figure 32B:
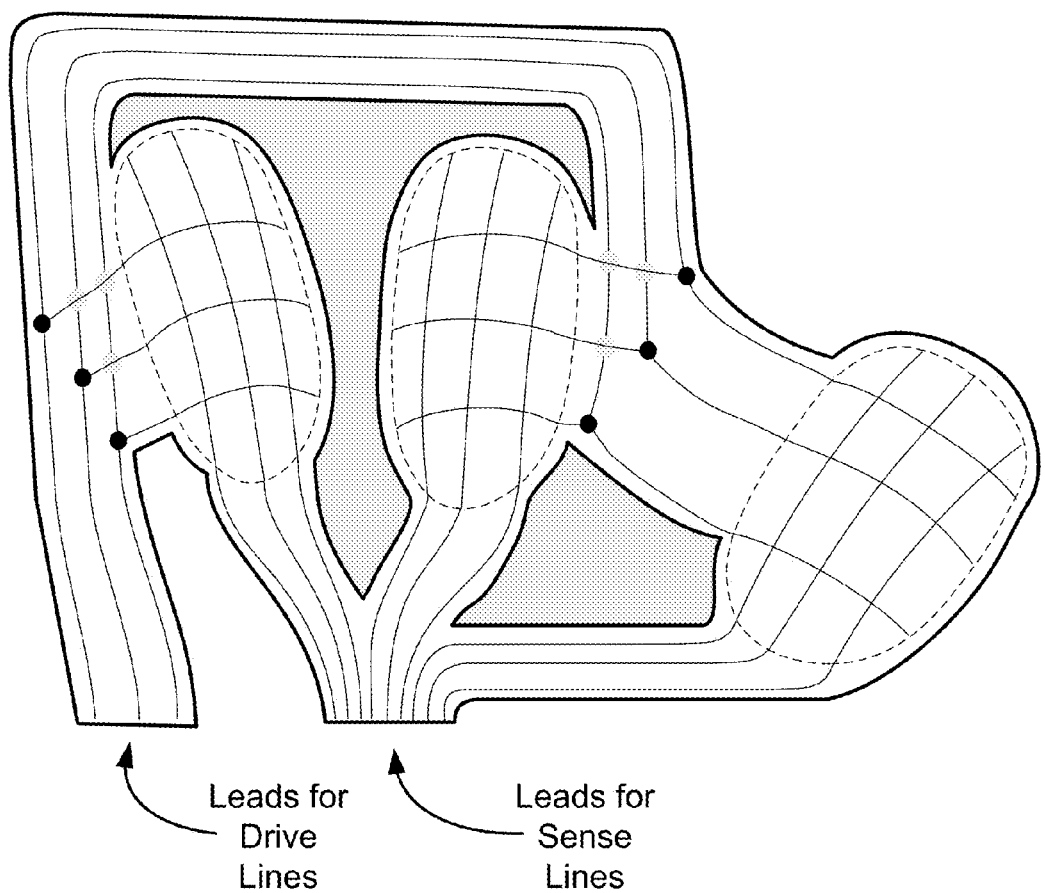
FIG. 32B is a simplified plan view of a portion of a flexible printed circuit according to an embodiment of the present invention.

FIG. 32B is a simplified plan view of a portion of a flexible printed circuit according to an embodiment of the present invention. The three sensor zones of the FPC are shown with a cut-out view. The leads used to contact the printed circuit board are shown with three leads for the drive lines and nine leads for the sense lines. The drive leads will fit into connector 3120 and the sense leads will fit into connector 3122. The cut-out view illustrates how portions of the larger FPC panel can be removed to remove material that is not used in conveying signals or otherwise in the device. The cut-out profile enables the various sensor zones to be operated independently while sharing the common drive lines, as for example, left and right buttons in FIG. 30A.

Figure 33:
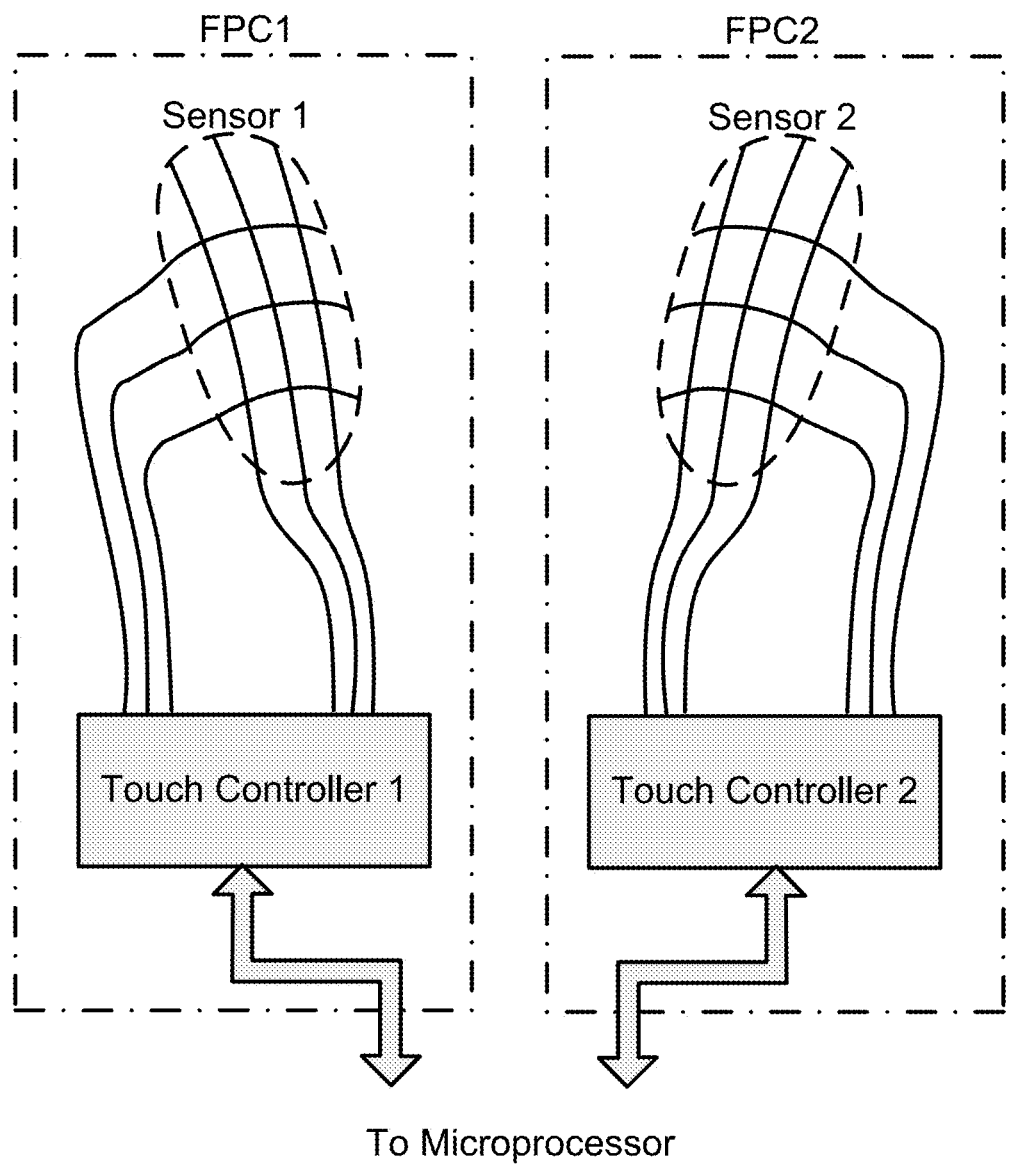
FIG. 33 is a simplified schematic diagram illustrating multiple touch sensors and touch controllers according to an embodiment of the present invention.

FIG. 33 is a simplified schematic diagram illustrating multiple touch sensors and touch controllers according to an embodiment of the present invention. As shown in FIG. 33, two flexible printed circuits are used. Rather than placing multiple touch zones on a single FPC, each of the independent touch zones have been moved to an independent FPC provided with its own touch controller. Embodiments of the present invention can include FPCs with multiple touch zones, FPCs with a single touch zone, combinations thereof, or the like. In some embodiments, multiple sensor zones use a shared touch controller and in other embodiments, a single touch controller is utilized for a sensor zone. One of ordinary skill in the art would recognize many variations, modifications, and alternatives.

Figure 25A:
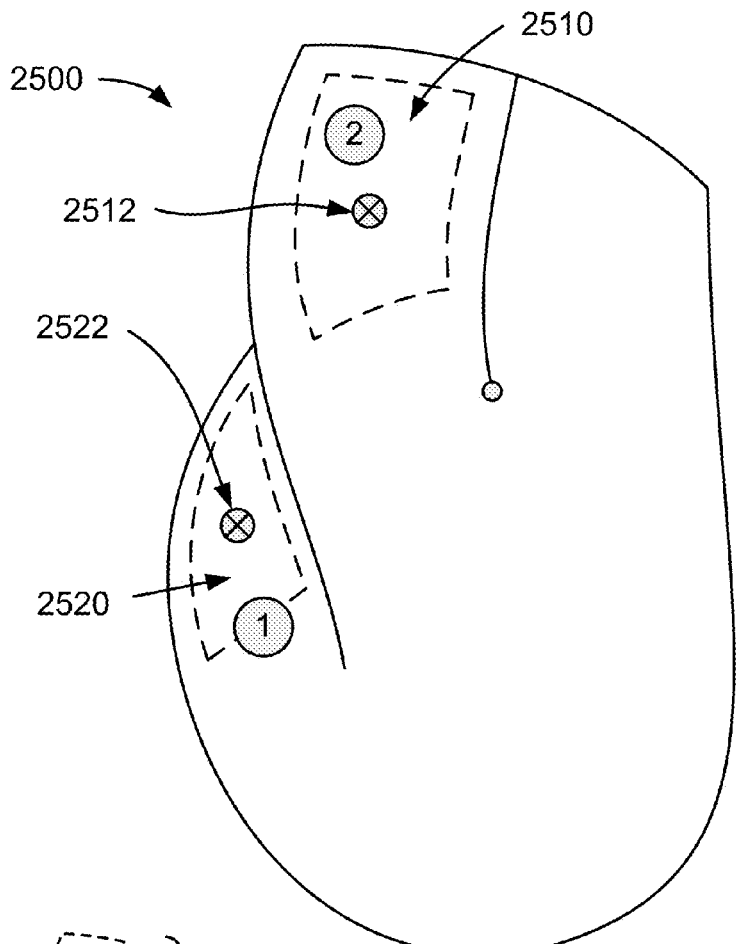
FIG. 25A is a simplified plan view of a pointing device including two touch pads according to an embodiment of the present invention.

FIG. 25A is a simplified plan view of a pointing device including two touch pads according to an embodiment of the present invention. Referring to FIG. 25A, a first touch pad 2510 is provided adjacent an area under the index finger of the user during operation of the pointing device 2500 and a second touch pad 2520 is provided adjacent an area under the thumb of the user during operation. A position of the center of the finger and thumb is indicated by the circled "X" 2512 and 2522, respectively. Scrolling functionality is provided by sliding the index finger forward and backward on touch pad 2510 in one embodiment. Thus, as illustrated in FIG. 25A, the conventional scroll wheel provided at a generally centered portion of the mouse is replaced by the "solid state scroll wheel" functionality provided by touch pad 2510.

As an alternative to scrolling using the index finger and touch pad 2510, scrolling can also be performed using sliding of the thumb over the touch pad 2520 in either a direction aligned with the length of the mouse or other suitable direction, for example, aligned with the width of the mouse. According to various embodiments of the present invention, the operation of the device can be defined using software programs operable to interact with the mouse, enabling a user to define the functions achieved by various motions of the fingers/thumb/palm, and hand.

Figure 26:
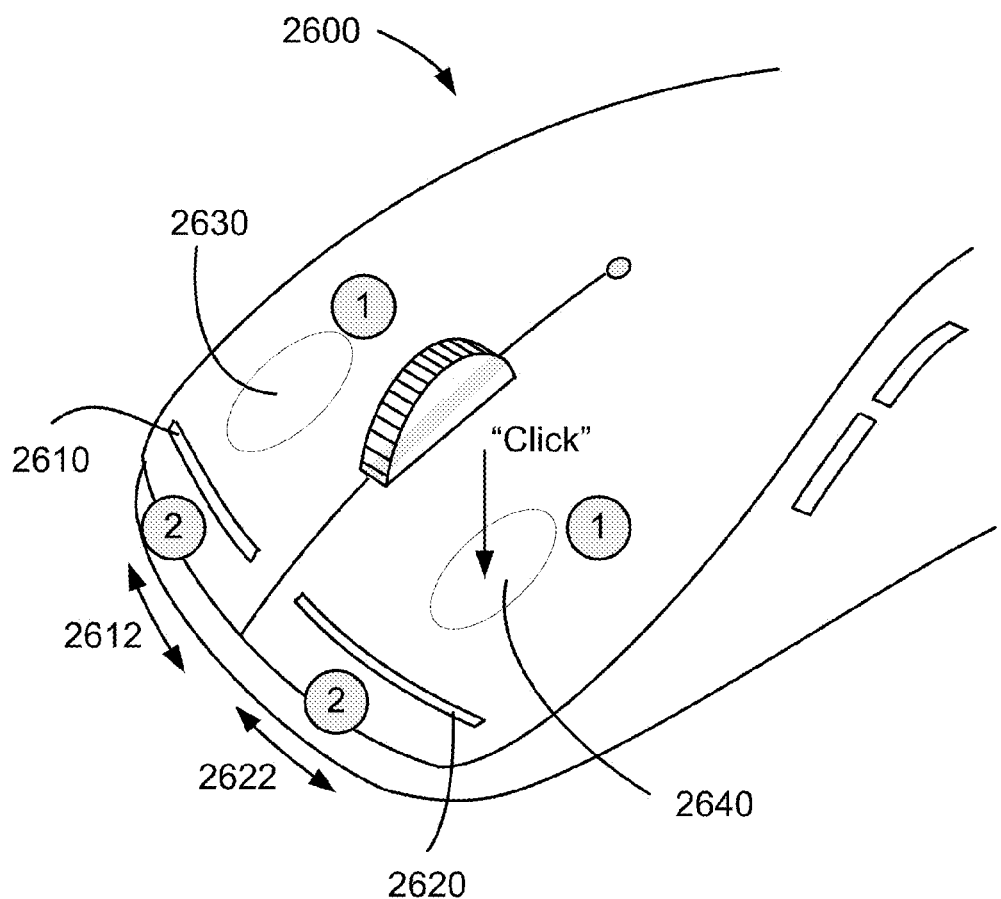
FIG. 26 is a simplified perspective view of a portion of a pointing device including transversal touch pads according to an embodiment of the present invention.

Embodiments of the present invention can utilize two or more touch sensors disposed on different portions of the mouse, for example, located in different planes. As illustrated in FIG. 25A, touch pad 2510 is located in a top surface of the mouse at a first height from the bottom of the mouse. Touch pad 2520 is located on a lower/side surface of the mouse at a distance closer to the bottom of the mouse than the top surface. Thus, the two touch pads are located at different heights from the bottom surface of the mouse. In other embodiments, the touch pads may be planar, but with the planes oriented at different angles to the horizontal or vertical and at different heights from a common surface (for example, the bottom surface). Merely by way of example, one touch pad on a left side of a mouse could be angled down and to the left while a second touch pad on the right side of the mouse could be angled down and to the right. Referring to FIG. 26, two touch pads could be positioned at 2630 and 2640 on either side of the roller, with the planes of the two touch pads not coplanar, but tilted with respect to the center of the mouse where the roller is positioned.

Figure 25B:
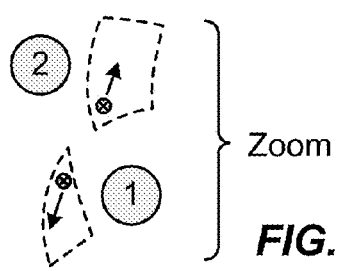
FIGS. 25B-D illustrate functions associated with the pointing device illustrated in FIG. 25A.
Figure 25C:
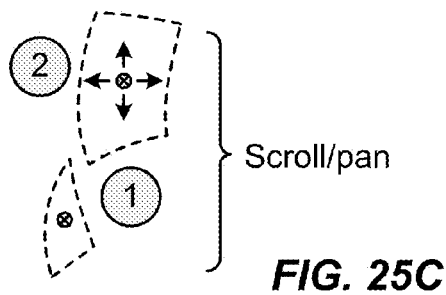
Figure 25D:
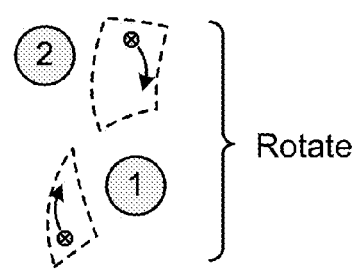

FIGS. 25B-D illustrate functions that may be associated with the pointing device illustrated in FIG. 25A. Referring to FIG. 25B, a zoom-out or stretch functionality is provided by sliding the index finger along touch pad 2510 in a first direction and the thumb along touch pad 2520 in a second direction generally opposite to the first direction so that the separation between the thumb and finger increases. A zoom-in or pinch functionality is provided by sliding the index finger along touch pad 2510 in a first direction and the thumb along touch pad 2520 in a second direction generally opposite to the first direction so that the separation between the thumb and finger decreases.

Referring to FIG. 25C, a scroll functionality is provided by sliding the index finger along touch pad 2510 in a direction generally aligned with the length of the mouse while the thumb is stationary on touch pad 2520. A horizontal pan functionality is provided by sliding the index finger along touch pad 2510 in a direction generally aligned with the width of the mouse while the thumb is stationary on touch pad 2520. In other embodiments, the motion of the finger/thumb can be interchanged to achieve a similar functionality. Additionally, although motion of the index finger is used in these examples, other fingers could be utilized as well to achieve similar functionality. One of ordinary skill in the art would recognize many variations, modifications, and alternatives.

Referring to FIG. 25D, a clockwise rotation functionality is provided by sliding the index finger along touch pad 2510 in a generally clockwise direction while sliding the thumb along touch pad 2520 in a generally clockwise direction. Counterclockwise rotation is provided by the action of sliding the index finger along touch pad 2510 in a generally counterclockwise direction while sliding the thumb along touch pad 2520 in a generally counterclockwise direction. Holding one of the thumb or finger stationary during rotation of the other digit can provide a rotate functionality at a reduced rate to provide for higher resolution rotation control.

FIG. 26 is a simplified perspective view of a portion of a pointing device including transversal touch pads according to an embodiment of the present invention. Referring to FIG. 26, two touch zones 2610 and 2620 are provided along a front peripheral portion of the pointing device 2600. In an embodiment, the touch zones 2610 and 2620 are positive emboss features to provide for tactile functionality, enabling the user to receive a tactile indication that the user's fingers have reached the lateral capacitance sensors. Motion along the touch zones 2610 and 2620 as illustrated by motion arrows 2612 and 2622 provides for lateral capacitive sensing. Thus, left to right gestures associated with the tips of the fingers is detectable using this implementation.

A set of negative emboss regions 2630 and 2640 are provided adjacent to touch zones 2610 and 2620 at positions under the fingers closer to the palm during operation. As will be evident to one of skill in the art, separation of the motions associated with multiple joints of the finger is possible using the embodiment illustrated in FIG. 26. As illustrated in FIG. 26, the touch zones 2610 and 2620 are thin regions next to the front surface of the pointing device 2600. The negative emboss regions 2630 and 2640 provide a rest area for the finger tip during a first phase of operation. Thus, clicking of the negative emboss regions 2630 and 2640 can result in right and left clicks. Thus, the shape of the mouse provides a natural rest position for the fingertips during a first phase of operation. It should be noted that in some embodiments, negative emboss regions 2630 and 2640 can include touch zones to provide additional functionality. In a second phase of operation, one or both finger tips are moved to position(s) over the touch zones 2610 and/or 2620 to achieve lateral motion over the lateral touch pads, thereby providing a scroll/pan functionality depending on the particular application. In some implementations, motion of one finger over one of the touch zones while the other finger is stationary over the other touch zone can provide one or more functionalities. One of ordinary skill in the art would recognize many variations, modifications, and alternatives.

Figure 27A:
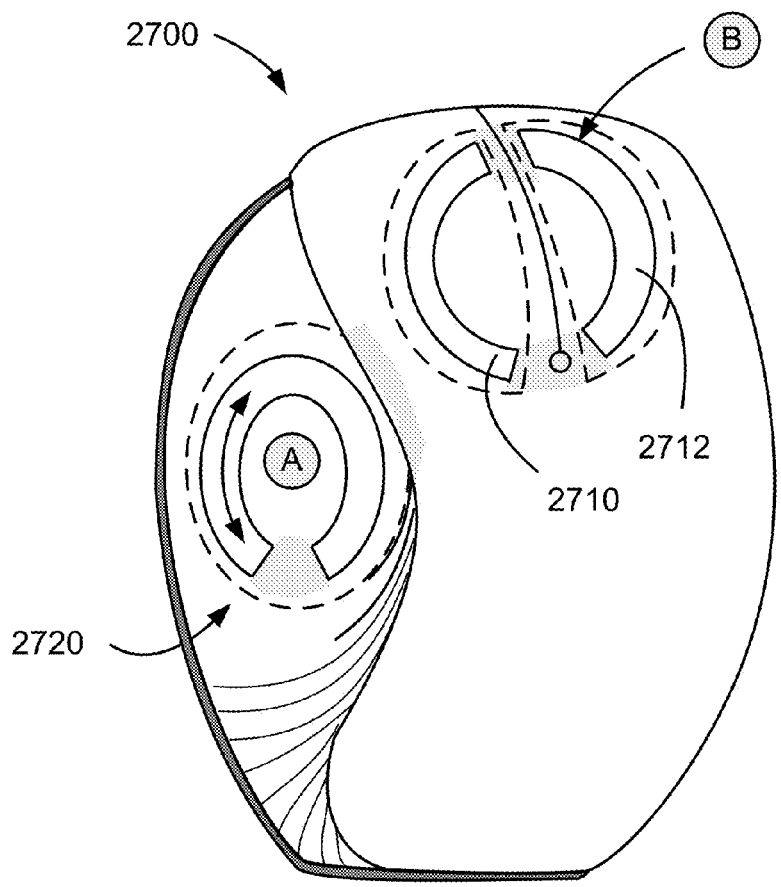
FIG. 27A is a simplified plan view of a pointing device including scroll wheels according to an embodiment of the present invention.

FIG. 27A is a simplified plan view of a pointing device including scroll wheels according to an embodiment of the present invention. Referring to FIG. 27A, the pointing device 2700 includes a set of first touch sensors 2710 and 2712 adjacent the index and middle fingers of the user during operation, illustrated as region B, and a second touch sensor 2720 adjacent the thumb of the user during operation, illustrated as region A. Although the first set of touch sensors 2710 and 2712 are illustrated as two touch sensors, the functionality can be combined into a single touch sensor in some embodiments. Thus, using the embodiment illustrated in FIG. 27A, wheel-like motion can be detected. The circular motion touch sensors 2710/2712 and 2720 can be rectangular arrays or ring-shaped arrays as appropriate to the particular design. Gesture analysis can be used to detect circular motion for implementations using square or rectangular grids. A round circular slider can be used in other embodiments.

In the implementation illustrated in FIG. 27A, a finger wheel is provided in region B on the top case of the mouse. The finger tip can be used to achieve circular motion along the touch pads and can be used to scroll, pan, increase or decrease volume, or other suitable behaviors. The detection of the gesture and the action taken upon detection of the gesture are separable. For example, vertical scroll on a screen could be implemented by rotation of the finger on the first set of touch pads and audible scroll (volume change) could be implemented by rotation of the thumb. Thus, embodiments of the present invention are not limited to scrolling and panning, but other slider controls including volume, zoom, rotations, or any other granular control can be achieved using embodiments of the present invention.

Figure 27B:
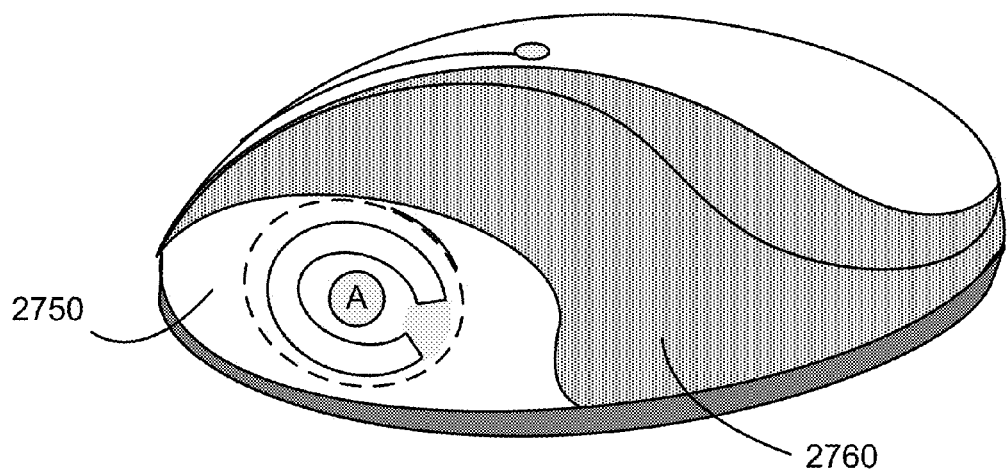
FIG. 27B is a simplified perspective drawing of the pointing device illustrated in FIG. 27A.

FIG. 27B is a simplified perspective drawing of the pointing device illustrated in FIG. 27A. As illustrated in FIG. 27B, a gliding surface is provided for the thumb so that the thumb moves over the gliding surface 2750 easily and a rubberized surface 2760 is provided between the thumb and finger regions to provide grip. In FIG. 27B, the tilt of the thumb region is shown although this region is illustrated as flat in FIG. 27A for purposes of clarity. As will be evident to one of skill in the art, the surface below the thumb provides a region with touch pad functionality. In the embodiment illustrated in FIG. 27B, a material surface decoration (MSD), which may include metals or other materials, is provided although this is not required by embodiments of the present invention. Thus, embodiments of the present invention provide an area to rest the thumb, enabling a feeling similar to a touch pad.

Figure 28A:
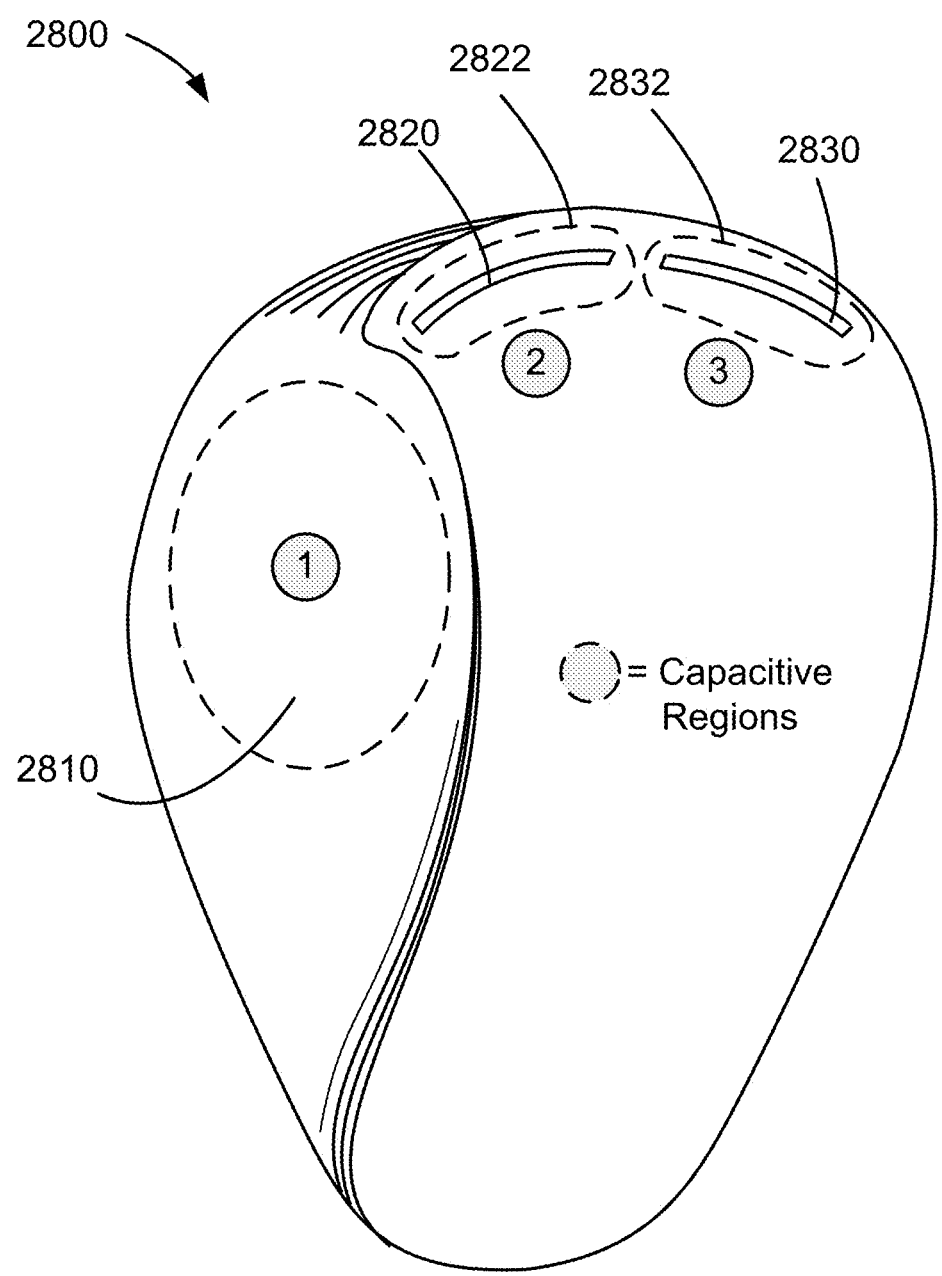
FIG. 28A is a simplified drawing illustrating a pointing device including multiple touch zones according to an embodiment of the present invention.

FIG. 28A is a simplified drawing illustrating a pointing device including multiple touch zones according to an embodiment of the present invention. Referring to FIG. 28A, the pointing device 2800 includes a zone 2810 is provided at the position of the user's thumb. The zone 2810 can share common features with second touch sensor 2720 illustrated in FIG. 27A. Circular as well as linear movement of the thumb can be detected using scroll wheel 2810. A capacitive sensor used for the zone 2810 is illustrated by dashed lines 2818. Additionally, the pointing device 2800 (also referred to as a mouse or a lemon drop mouse) also includes a positive emboss 2820 for the index finger and a positive emboss 2830 for the middle finger with capacitive touch pads illustrated by dashed lines 2822 and 2832 located under the positive embosses. The positive embosses 2820 and 2830 can share common features with touch zones 2610 and 2620 illustrated in FIG. 26. The lemon drop shape of pointing device 2800 provides additional surface area suitable for detection of finger gestures and features a narrowing shape at portions of the pointing device adjacent the wrist of the user.

FIG. 28B illustrates a gestures table describing results achieved based on various inputs according to an embodiment of the present invention. Embodiments of the present invention utilize touch pads that are able to measure movement along two dimensions (e.g., multi-dimension touch pads) as well as multi-touch touch pads, (e.g., touch pads that are able to detect and measure multiple fingers on a single touch pad). As an example, the touch pad can detect the tip of the finger and not to be confused by the other joints positioned on the touch pad, thereby tracking only on the tip of the finger. As described more fully below, the multi-touch touch pads enable embodiments of the present invention to provide a wide range of gesturing functionality. The gestures illustrated in FIG. 28B are not intended to limit the scope of the present invention, but are merely exemplary and other gestures are included within the scope of the present invention. Thus, the following gestures are supported by various embodiments of the present invention, although many more gestures can be defined.

Referring to FIG. 28B, the columns describe the motion of the mouse (x,y movement), the action performed in Zone 1 of FIG. 28A (i.e., zone 2810 adjacent the thumb), the action performed in Zone 2 of FIG. 28A (i.e., positive emboss 2820 adjacent the index finger), the action performed in Zone 3 of FIG. 28A (i.e., positive emboss 2830 adjacent the middle finger), and the result produced by this combination of gestures.

Row 1 illustrates a stationary mouse, scrolling or rotation of the thumb, and stationary fingers to produce a vertical scrolling motion. Row 2 illustrates a stationary mouse, scrolling or rotation of the thumb, a stationary middle finger, and a click with the index finger. Row 3 illustrates a stationary mouse, a stationary thumb, and lateral motion of either the index finger or the middle finger while the other finger is stationary to produce a horizontal panning motion, also referred to as a horizontal scroll. Row 4 illustrates a stationary mouse, a stationary thumb, and lateral motion of both the index finger and the middle finger to produce a double speed horizontal panning motion.

Row 5 illustrates a stationary mouse, clockwise rotation of the thumb (an arc action), and lateral motion to the right of both the index finger and the middle finger to produce a forward/next result. Counterclockwise rotation of the thumb (an arc action) and lateral motion to the left of both the index finger and the middle finger while the mouse is stationary produces a back/previous result. Row 6 illustrates a stationary mouse, counterclockwise rotation of the thumb and lateral motion of either the index finger or the middle finger to the right while the other finger is stationary to produce a zoom in result. Clockwise rotation of the thumb and lateral motion of either the index finger or the middle finger to the left while the other finger is stationary can produce a zoom in result. Row 7 illustrates motion of the mouse in either or both the vertical or horizontal direction, a stationary thumb, clicking of the index finger, and a stationary middle finger to produce a panning motion that slides the window down, sometimes represented by a "hand" symbol.

Utilizing embodiments of the present invention, other motions of the fingers and thumb in conjunction with the motion of the mouse can be combined to produce a variety of results. The following non-limiting examples are provided. Motion of the index finger in isolation can be used for scrolling, panning, or 2D panning utilizing either 1D or 2D touch sensors. Motion of the middle finger in isolation can be used for list scrolling after a right click is accomplished using the middle finger. This can also be used to activate a contextual menu. Joint motion of the index finger and the middle finger up or down can be used for zooming up or down. Typically, this will be implemented by moving two fingers in same direction and at a similar speed. Joint motion of the index finger and the middle finger up or down, but in substantially opposite directions can be used to produce rotation. Swiping of the thumb up and down or left and right can be used to produce previous/next, back/forward, page up/page down, or other similar results. Motion of three digits in combination (e.g., thumb+index finger+middle finger) can be used to expand or concentrate. As an example, this multi-digit motion can be used to manage multiple applications and bring a desired application to the front of the display, similar to use of ALT-TAB in Windows operating systems.

Utilizing embodiments of the present invention, multi-finger gestures are provided. Merely by way of example, some of the gestures supported and provided by embodiments of the present invention include finger tracking for cursor motion, two finger tracking for scrolling, three finger swiping for back and forth actions, multi-finger motion for rearranging windows (especially in Multitask environments), and the like.

In some embodiments, four finger gestures are provided. Examples of these four finger gestures include a four finger stretch to reduce the window size, a four finger zoom to increase the size of the windows, a four finger stretch "swipe" to reduce/minimize a window, a four finger zoom "swipe" to maximize a window (supported by some Windows operating systems), a four finger move in two dimensions (e.g., x,y) to move a position of the cursor on the screen, a four finger lateral swipe to stick a window to the right/left side of screen (supported by some Windows operating systems), or the like. These gestures are merely exemplary and do not limit the scope of the present invention.

In some embodiments, drivers are embedded in an RF receiver and the drivers load when inserted into a computer in a manner similar to a USB flash memory device. In these implementations, the driver can perform gesture recognition or can simulate a digitizer (i.e., a virtual driver) to provide, for example, zoom implementation. In other embodiments, power management techniques discussed herein are supplemented by a method in which, when no motion is detected, the pointing devices goes into a wake mode in which the built-in touch controller uses a supervised mode in which the microcontroller is operated in either a standby or a run mode, verifying motion or image change in the capacitance measurements. Additionally, some embodiments provide methods and systems for utilizing a force or pressure sensor that measures force or pressure, together with a capacitive sensor. These embodiments provide increase functionality since the pressure sensor can provide information useful in determining which finger (e.g., left or right) clicks with a single mechanical click. In yet other embodiments, an edge zone of a touch sensor is used as a zone to facilitate a slider-control, allowing, for example, for volume control functionality or other slider-based controls. Moreover, some embodiments use electrodes deposited directly on plastic, increasing system reliability and reducing system cost. Embodiments of the present invention make it possible to use multi-touch sensors that allow for multiple touch contact areas for either separate digits or a single digit (e.g., for a single finger). Some implementations utilize capacitive sensors for which the pitch of the nodes is small enough to discriminate portions of a finger and only track on the finger tip, which can be considered as the touch point that is the farthest from the palm.

It will be appreciated by one of skill in the art that although some implementations are discussed in terms of capacitive sensors and/or proximity detectors, various embodiments of the present invention may use other types of technologies (e.g., resistive technologies, optical technologies, combinations thereof, or the like) for sensing touch, proximity, or other suitable inputs. One of ordinary skill in the art would recognize many variations, modifications, and alternatives.

Figure 29:
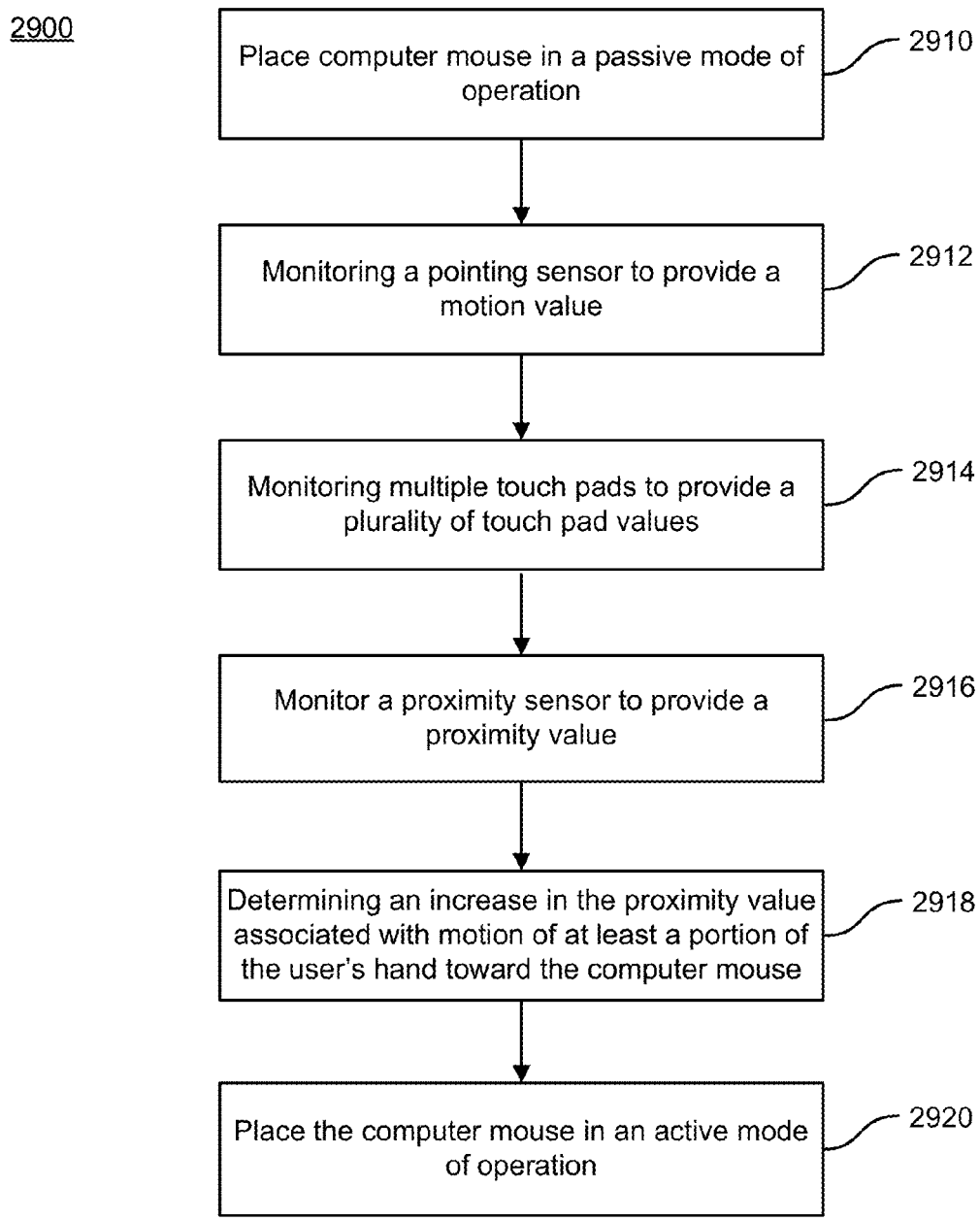
FIG. 29 is a simplified flowchart illustrating a method of operating a cursor control peripheral device according to an embodiment of the present invention.

FIG. 29 is a simplified flowchart illustrating a method of operating a cursor control peripheral device according to an embodiment of the present invention. The method is applicable to the operation of a computer mouse having a pointing sensor, multiple touch pads, and a proximity sensor. The method 2900 includes placing the computer mouse in a passive mode of operation (2910) and monitoring the pointing sensor to provide a motion value (2912). As an example, the passive mode of operation can be characterized by a first frame rate of operation.

The method also includes monitoring the multiple touch pads to provide a plurality of touch values (2914) and monitoring the proximity sensor to provide a proximity value (2916). The method further includes determining an increase in the proximity value associated with motion of at least a portion of a user's hand toward the computer mouse (2918) and placing the computer mouse in an active mode of operation (2920). As an example, the active mode of operation can be characterized by a second frame rate higher than the first frame rate.

In an embodiment, a plurality of drive lines are associated with the multiple touch pads and the plurality of drive lines are operable to provide input signals to the proximity sensor. In this embodiment, placing the computer mouse in a passive mode of operation can include placing the plurality of drive lines into a high impedance mode. In the active mode of operation, the method can additionally include determining that the motion value is substantially zero, determining that at least one of the plurality of touch values is non-zero, and thereafter, transmitting a finger movement command associated with the at least one of the plurality of touch values.

It should be appreciated that the specific steps illustrated in FIG. 29 provide a particular method of operating a cursor control peripheral device according to an embodiment of the present invention. Other sequences of steps may also be performed according to alternative embodiments. For example, alternative embodiments of the present invention may perform the steps outlined above in a different order. Moreover, the individual steps illustrated in FIG. 29 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 34A:
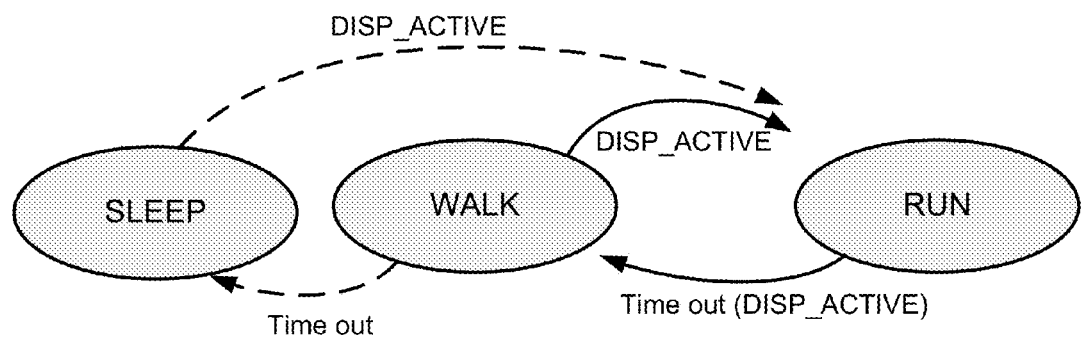
FIGS. 34A-34D are state diagrams illustrating state machines according to embodiments of the present invention.

FIGS. 34A-34D are state diagrams illustrating state machines according to embodiments of the present invention. FIG. 34A is a state diagram for mouse displacement sensing that provides benefits with respect to reduced power consumption. Each state illustrates a mode of operation for either the optical sensor or the touch sensor. As an example, each optical sensor (mouse displacement sensing) can be either in run mode, in walk mode, or in sleep mode. The three illustrated modes are provided merely by way of example to illustrate modes with differing power consumption and embodiments of the present invention are not limited to only three modes, but can utilize a fewer or greater number of modes as appropriate to the particular application. In the sleep mode, the mouse has not been used for a predetermined time and the frame rate is at a low rate. When a DISP_ACTIVE signal is received, the state changes for the displacement sensing system to the run mode, which is characterized by a higher frame rate (e.g., 1,000 frames per second) and higher power consumption than the sleep mode (e.g., 2 Hz). DISP_ACTIVE is an event triggered by the displacement sensor (mouse optical sensor) 3150 whenever a displacement is measured. A displacement sensor may also be referred to as a displacement controller. Displacement, motion, movement, and other like terms can be used to describe the sensing of motion of the input device in one or more directions throughout the present specification. Although some embodiments related to displacement in a three dimensional coordinate system, the term displacement can be understood to include rotation such as pitch, yaw, and roll about axes. One of ordinary skill in the art would recognize many variations, modifications, and alternatives.

If the motion of the mouse is stopped for a predetermined time, a timeout of the displacement activity is implemented to transition the mouse to the walk mode, which is characterized by a power consumption level intermediate to the sleep mode and the run mode. As an example, the frame rate for the displacement sensing system can be 20 Hz. timeout (DISP_ACTIVE) transitions the displacement sensing system to the walk mode. If inactivity is continued after a second predetermined time, another timeout event will occur, transitioning the state to the sleep mode. If movement is sensed (DISP_ACTIVE) before the timeout, the state will transition back to run mode with a reduced latency compared to the transition from sleep mode to run mode.

Figure 34B:
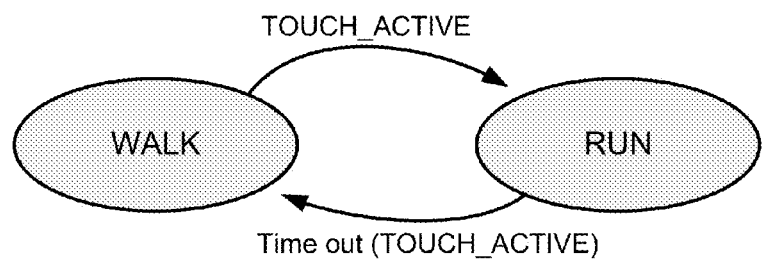

FIG. 34B is a state diagram for mouse touch sensing. Similar to FIG. 34A, walk and run modes, as well as an optional sleep mode, are illustrated. When the TOUCH_ACTIVE signal is received, indicating that the touch sensor has been activated, the state changes to the mode with the next higher activity level. Timeouts are also used to return the touch sensor system to lower levels of power consumption. Because the displacement sensing and touch sensing are separated (i.e., independent state machines), different types of activity can be tracked. For example, if the user's hand is stationary on the desk and only the finger is moved, then the displacement mode can be maintained at a lower power consumption mode while the touch sensing system moves to a higher power mode. Thus, power management can include these two state machines, with one managed only on the basis of displacement activity and the other one based only on touch activity. TOUCH_ACTIVE is an event triggered when a finger is landing, or in a specific embodiment, when the finger has moved.

Figure 34C:
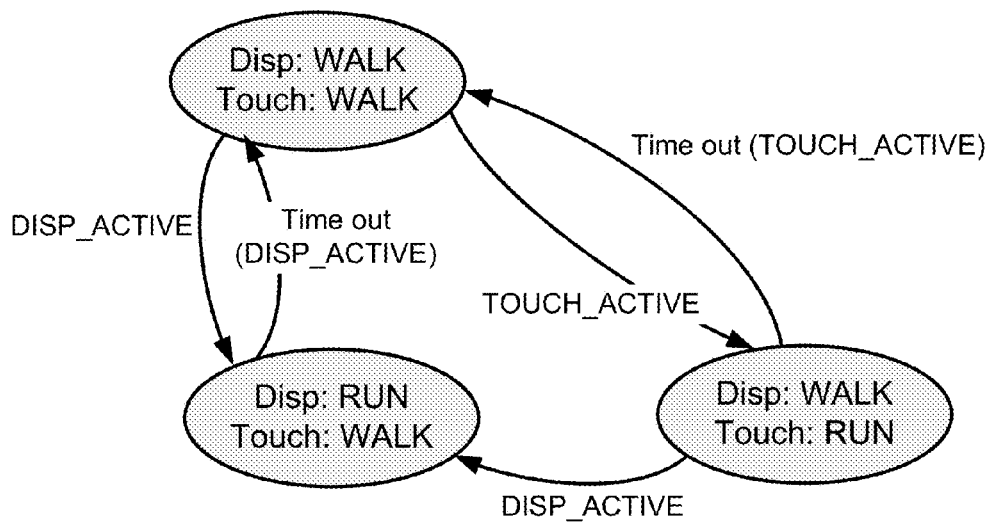

FIG. 34C is a state diagram for a combined state machine for displacement and touch sensing according to an embodiment of the present invention. As illustrated in FIG. 34C, the states for the displacement sensing and touch sensing are combined state machine with fewer states than used with independent state machines. The first state is Disp: Walk and Touch: Walk for which both the displacement sensor and the touch sensor are in walk mode. In these walk modes, both the displacement sensor and the touch sensor operate in a mid-range of power consumption, for example, with a frame rate of 20 Hz. If motion of the finger is detected, a TOUCH_ACTIVE signal will be received, resulting in a transition to the lower right state of Disp: Walk and Touch: Run in which the displacement sensor continues to operate at an intermediate power mode and the touch sensor moves into a higher frame rate mode of operation.

In certain embodiments, the data associated with the touch sensor can be used to modify or control or otherwise provide a useful input in relation to the power state of the motion sensor. As an example, if a touch activity is detected, the motion sensor may transition into a walk state (e.g., from a sleep state), since it is likely that the mouse may be moved subsequent to the user touching the mouse. Additionally, data associated with the proximity sensor can be used in relation to the power state of the touch sensor and/or the motion sensor. One of ordinary skill in the art would recognize many variations, modifications, and alternatives.

If the mouse is displaced, DISP_ACTIVE is received and a transition to the lower-left state of DISP: RUN and TOUCH: WALK is made in which the displacement sensor is in run mode and the touch sensor is in walk mode. Hence, whenever the displacement sensor is in Run mode, the touch controller is brought into a Walk mode, thus reducing system power consumption at the expense of a larger touch latency when the mouse is moved by the user. Alternatively, an additional state can be added in which the displacement sensor is in run mode and the touch sensor is in run mode as well. One of ordinary skill in the art would recognize many variations, modifications, and alternatives. Timeout of TOUCH_ACTIVE or DISP_ACTIVE will return both the displacement sensor and the touch sensor to the walk modes of operation as illustrated in FIG. 34B.

Figure 34D:
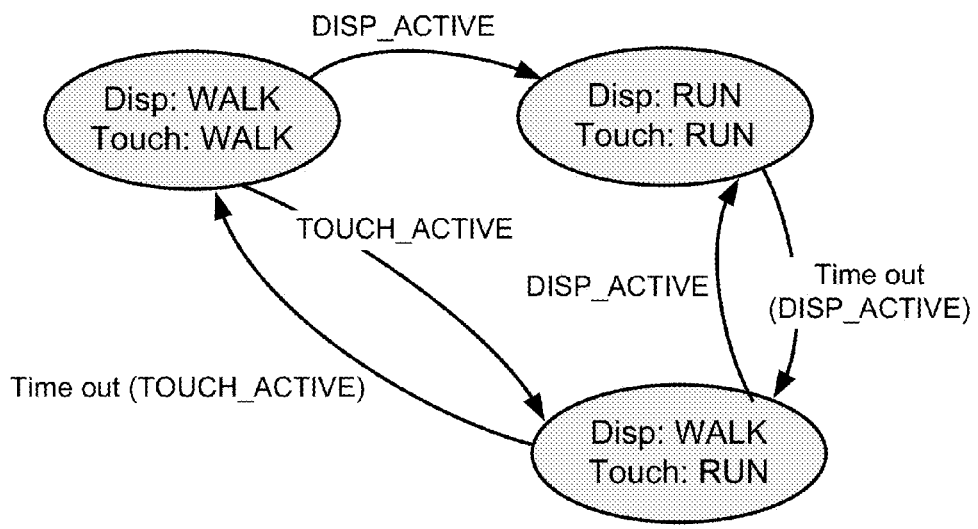

FIG. 34D is a state diagram for another embodiment utilizing combined a state machine. This embodiment implements a low touch latency whenever the mouse is moved, possibly at the expense of a larger system power consumption. Starting in walk mode for both the displacement and touch sensors, DISP_ACTIVE will cause a transition to Disp: Run and Touch: Run. TOUCH_ACTIVE from the walk modes for both sensors will cause a transition to Disp: Walk and Touch: Run. From this state, DISP_ACTIVE will cause a transition to Disp: Run and Touch: Run. Timeouts for DISP_ACTIVE and TOUCH_ACTIVE will cause the illustrated transitions.

The following pseudo-code describes the definition of TOUCH_ACTIVE based on finger change of position on the touch zone, as represented by the state machines discussed above. The pseudo-code is executed only when a finger is located on the touch zone.

```
%Init, at finger landing
Anchor_X = Read_Register(REG_ABSOLUTE_X);
Anchor_Y = Read_Register(REG_ABSOLUTE_Y);
threshold = LARGE_TH;
state = WALK;
timer = TIMEOUT;
%polling routine, every 2ms
if (finger_motion_interrupt == TRUE)
        %touch point has moved
        Abs_X = Read_Register(REG_ABSOLUTE_X);
        Abs_Y = Read_Register(REG_ABSOLUTE_Y);
        Delta_X = Abs_X-Anchor_X;
        Delta_Y = Abs_Y-Anchor_Y;
        if (abs( [Delta_X, Delta_Y] ) > threshold
                % event TOUCH_ACTIVE
                % touchpoint has moved more than threshold
                threshold = SMALL_TH
                state = RUN;
                Write_Register (REG_FRAME_RATE, FAST_RATE);
                timer = 0
                sendReport(Abs_X, Abs_Y);
                Anchor_X = Read_Register(REG_ABSOLUTE_X);
                Anchor_Y = Read_Register(REG_ABSOLUTE_Y);
        else
                %at rest (e.g. within threshold)
                if ( timer < TIMEOUT);
                        timer = timer + 1;
                elseif (state == RUN)
                        %event timeout(TOUCH_ACTIVE)
                        threshold = LARGE_TH;
                        state = WALK;
                        Write_Register
                        (REG_FRAME_RATE, SLOW_RATE);
                        Anchor_X = Abs_X
                        Anchor_Y = Abs_Y
                end
        end
end
```

The pseudo-code above provides insight into how the touch systems transitions from walk mode to run mode based on the detection of the TOUCH_ACTIVE or the timeout of TOUCH_ACTIVE. The process starts at finger landing with the touch system in the walk mode at which anchor positions are defined based on the absolute position in X and Y of the finger on the touch zone. The anchor positions are the positions where your finger is located at landing or instants of state transition in this embodiment. A threshold is defined as a large value for touch sensing in this initialization phase because the touch system is in the walk mode. Monitoring is performed on a 2 ms duty cycle to determine if finger motion has occurred (finger_motion_interrupt==TRUE). Although 2 ms is illustrated in this pseudo-code, this is not required by embodiments of the present invention and other duty cycles can be utilized.

A determination is made that the touch sensor has receive inputs when the motion with respect to the anchor positions is greater than the threshold. This is noted in the pseudo-code as TOUCH_ACTIVE. Once this touch condition is detected, the threshold is reduced to a smaller value and the state is placed in the run mode. The register frame rate is programmable to provide greater functionality to the touch controller. In run mode, the touch controller is operated at the fast frame rate, which consumes more power but provides more responsiveness. A timer value is cleared to define the start time for entering the run mode.

A verification is made that there is no timeout and if there is a timeout in run mode, then the touch sensor is placed back in the walk mode by resetting the threshold to its larger value. Thus, using the motion of the finger on the touch sensor and the timeouts, modes with higher and lower power consumption are provided. One of ordinary skill in the art would recognize many variations, modifications, and alternatives.

In a particular embodiment, one or more touch screens may be disposed on the mouse. As an example, the touch sensors discussed herein may be integrated with, positioned above, below, and/or to the side of the touch screens that are operable to both receive inputs and display image and video output. In some embodiments, a touch screen disposed on the mouse may have associated commands as discussed herein, (e.g., scroll, pan, and the like) that can be implemented by the user through touch control. As discussed throughout the present specification, the various commands received through the touch screen can be user configurable. One of ordinary skill in the art would recognize many variations, modifications, and alternatives.

As will be understood by those of skill in the art, the present invention may be embodied in other specific forms without departing from the essential characteristics thereof. For example, the pointing device could be connected to a TV, game console, or other device, which would fall within the definition of "computer" as used herein. Accordingly, the foregoing description is intended to be illustrative, but not limiting, of the scope of the invention which is set forth in the following claims. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   setting a motion frame rate of a computer mouse to a first motion frame rate, wherein the computer mouse includes a motion sensor and a touch sensor mounted on a housing of the computer mouse, and wherein the motion frame rate corresponds to a rate of detecting whether the computer mouse is moving along a surface;
   setting a touch frame rate of the computer mouse to a first touch frame rate, wherein the touch frame rate corresponds to a rate of detecting whether a user is touching the touch sensor of the computer mouse;
   receiving a signal from the motion sensor indicating motion of the computer mouse along a surface;
   determining that a user is not touching the touch sensor;
   based on receiving the signal from the motion sensor and determining that a user is not touching the touch sensor, placing the computer mouse in a second state of operation, wherein placing the computer mouse in the second state of operation includes:
      setting the motion frame rate to a second motion frame rate, wherein the second motion frame rate is higher than the first motion frame rate; and
      maintaining the touch frame rate in the first touch frame rate;
   receiving a signal from the touch sensor indicating touching of the touch sensor; and
   in response to receiving the signal from the touch sensor, placing the computer mouse in a third state of operation, wherein placing the computer mouse in the third state of operation includes:
      setting the touch frame rate to a second touch frame rate, wherein the second touch frame rate is higher than the first touch frame rate; and
      maintaining the motion frame rate in the second motion frame rate.

2. The method of claim 1 further comprising:
in response to determining a passing of a predetermined time period since receiving the signal from the touch sensor, with no further signal from the touch sensor, placing the computer mouse in the second state of operation.

3. The method of claim 1 wherein the computer mouse is placed into a sleep mode if no motion signal and no touch signal is detected for a predetermined period of time.

4. The method of claim 3 wherein the computer mouse further comprises an additional touch sensor, the touch sensor and the additional touch sensor being driven by common drive lines.

5. The method of claim 4 further comprising:
setting a touch frame rate of the additional touch sensor to the second touch frame rate in the third state of operation.

6. The method of claim 4 wherein the touch sensor is positioned above of a touch screen disposed on the computer mouse, and wherein the touch screen is configured to receive user-configurable commands.

7. The method of claim 4 wherein the additional touch sensor is disposed on a different portion of the computer mouse than the touch sensor.

8. The method of claim 7 wherein a zoom-out or stretch functionality is provided by sliding a finger along the touch pad in a first direction and a thumb along the additional touch pad in a second direction generally opposite to the first direction so that the separation between the thumb and finger increases.

9. A method comprising:
setting a motion frame rate of a computer mouse to a first motion frame rate, wherein the computer mouse includes a motion sensor and a touch sensor mounted on a housing of the computer mouse, and wherein the motion frame rate corresponds to a rate of detecting whether the computer mouse is moving along a surface;
setting a touch frame rate of the computer mouse to a first touch frame rate, wherein the touch frame rate corresponds to a rate of detecting whether a user is touching the touch sensor of the computer mouse;
receiving a first signal indicating a user touching the touch sensor of the computer mouse;
determining that the computer mouse is not moving along a surface;
placing the computer mouse in a second state of operation after receiving the first signal and determining that the computer mouse is not moving along the surface, wherein placing the computer mouse in the second state of operation includes:
 setting the touch frame rate to a second touch frame rate, wherein the second touch frame rate is higher than the first touch frame rate; and
 setting the motion frame rate to a second motion frame rate, wherein the second motion frame rate is one of a low and intermediate rate, but not a high rate;
receiving a second signal indicating motion of the computer mouse along a surface; and
in response to receiving the second signal, placing the computer mouse in a third state of operation, wherein placing the computer mouse in the third state of operation includes:
 setting the motion frame rate to a third motion frame rate, wherein the third motion frame rate is higher than the second motion frame rate and the first motion frame rate; and
 maintaining the touch frame rate in the second touch frame rate.

10. The method of claim 9 further comprising placing the computer mouse into a sleep mode if no motion and no touch signal is detected for a predetermined period of time.

11. The method of claim 9 wherein the computer mouse further comprises an additional touch sensor, wherein the touch sensor and the additional touch sensor are driven by common drive lines.

12. The method of claim 9 wherein the second motion frame rate is the intermediate rate, and wherein the intermediate rate is higher than the first motion frame rate.

13. The method of claim 12 further comprising:
in response to determining that the computer mouse is not moving along the surface for a predetermined period of time, placing the computer mouse in the second state of operation.

14. A computer mouse comprising:
a motion sensor to provide a signal indicating motion of the computer mouse along a surface, wherein the motion sensor includes a motion frame rate, and wherein the motion frame rate corresponds to a rate of detecting whether the computer mouse is moving along a surface;
a touch pad to provide a signal indicating a user touching the touch pad, wherein the touch pad includes a touch frame rate, and wherein the touch frame rate corresponds to a rate of detecting whether a user is touching the touch pad;
a processor coupled to the motion sensor and the touch pad; and
non-transitory, computer readable media coupled to the processor, and containing instructions including:
 set the motion frame rate of to a first motion frame rate;
 set the touch frame rate to a first touch frame rate;
 receive a first signal indicating a user touching the touch pad;
 determine that the computer mouse is not moving along a surface;
 place the computer mouse in a second state of operation after receiving the first signal and determining that the computer mouse is not moving along the surface, wherein placing the computer mouse in the second state of operation includes:
  setting the touch frame rate to a second touch frame rate, wherein the second touch frame rate is higher than the first touch frame rate; and
  setting the motion frame rate to a second motion frame rate, wherein the second motion frame rate is one of a low and intermediate rate, but not a high rate;
 receive a second signal indicating motion of the computer mouse along a surface; and
 in response to receiving the second signal, place the computer mouse in a third state of operation, wherein placing the computer mouse in the third state of operation includes:
  setting the motion frame rate to a third motion frame rate, wherein the third motion frame rate is higher than the second motion frame rate and the first motion frame rate; and
  maintaining the touch frame rate in the second touch frame rate.

15. The computer mouse of claim 14 wherein the frame rate of the motion sensor is an intermediate frame rate between the high frame rate and a sleep mode frame rate, and wherein the non-transitory, computer readable media further contains instructions for transitioning the motion sensor from a sleep mode frame rate to the intermediate frame rate in response to a signal from the touch pad and an absence of a signal from the motion sensor.

16. The computer mouse of claim 14 wherein the low frame rate of the touch pad is an intermediate frame rate between the high frame rate and a sleep mode frame rate, and wherein the non-transitory, computer readable media further contains instructions for transitioning the touch pad from a sleep mode frame rate to the intermediate frame rate in response to a signal from the motion sensor and an absence of a signal from the touch pad.

17. A computer mouse comprising:
 a motion sensor to provide a signal indicating motion of the computer mouse along a surface, wherein the motion sensor includes a motion frame rate, and wherein the motion frame rate corresponds to a rate of detecting whether the computer mouse is moving along a surface;
 a touch pad to provide a signal indicating a user touching the touch pad, wherein the touch pad includes a touch frame rate, and wherein the touch frame rate corresponds to a rate of detecting whether a user is touching the touch pad;
 a processor coupled to the motion sensor and the touch pad; and
 non-transitory, computer readable media coupled to the processor, and containing instructions including:
  set the motion frame rate to a first motion frame rate;
  set the touch frame rate to a first touch frame rate;
  receive a signal from the motion sensor indicating motion of the computer mouse along a surface;
  determine that a user is not touching the touch pad;
  based on receiving the signal from the motion sensor and determining that a user is not touching the touch pad, place the computer mouse in a second state of operation, wherein placing the computer mouse in the second state of operation includes:
   setting the motion frame rate to a second motion frame rate, wherein the second motion frame rate is higher than the first motion frame rate; and
   maintaining the touch frame rate in the first touch frame rate;
  receive a signal from the touch pad indicating touching of the touch pad; and
  in response to receiving the signal from the touch pad, place the computer mouse in a third state of operation, wherein placing the computer mouse in the third state of operation includes:
   setting the touch frame rate to a second touch frame rate, wherein the second touch frame rate is higher than the first touch frame rate; and
   maintaining the motion frame rate in the second motion frame rate.

* * * * *